US006427744B2

(12) United States Patent
Seki et al.

(10) Patent No.: US 6,427,744 B2
(45) Date of Patent: Aug. 6, 2002

(54) LAMINATING DEVICE FOR CONSECUTIVELY LAMINATING PLURAL SHEETS

(75) Inventors: Takao Seki; Motohito Muraki, both of Nagoya; Kazuki Ohashi, Hashima, all of (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 42 days.

(21) Appl. No.: 09/748,191

(22) Filed: Dec. 27, 2000

(30) Foreign Application Priority Data

Dec. 28, 1999 (JP) .......................................... 11-374067

(51) Int. Cl.[7] ................................................ B32B 31/00

(52) U.S. Cl. ........................ 156/353; 156/364; 156/522; 156/552; 156/555; 156/582

(58) Field of Search ................................ 156/351, 352, 156/353, 354, 355, 362, 363, 364, 522, 552, 555, 580, 582

(56) References Cited

U.S. PATENT DOCUMENTS 5,571,368 A * 11/1996 Barge ......................... 156/359
5,639,339 A * 6/1997 Couillard .................... 156/555
5,735,998 A * 4/1998 Bradshaw ................... 156/495
5,853,531 A * 12/1998 Murphy et al. ............. 156/555

FOREIGN PATENT DOCUMENTS

JP 6-122153 5/1994

* cited by examiner

*Primary Examiner*—James Sells
(74) *Attorney, Agent, or Firm*—Oliff & Berridge, PLC

(57) ABSTRACT

A laminating apparatus includes a detector disposed between introduction-side transport rollers and a web supply unit. When the detector detects a front edge of a prior object transported by the introduction-side transport rollers, then the introduction-side transport rollers and a laminate processing unit transport and laminate the prior object until a rear edge of the prior object is positioned in the vicinity of the web supply unit, whereupon transport and lamination of the prior object are stopped for a predetermined duration of time. Then once the detector detects a front edge of the subsequent object after the predetermined duration of time elapses from stopping transport of the prior object, the introduction-side transport rollers transport a subsequent object to the laminate processing unit.

7 Claims, 18 Drawing Sheets

LAMINATING DEVICE FOR CONSECUTIVELY LAMINATING PLURAL SHEETS

BACKGROUND OF THE INVENTION

1. Field of the Invention

The present invention relates to a laminating apparatus for executing laminating processes on an object, such as a paper sheet, to cover the object by adhering a synthetic resin sheet or web to the upper and lower surfaces of the object.

2. Description of the Related Art

There has been a laminating device for laminating a synthetic resin web, for example, onto a card or other sheet-shaped object.

Japanese Patent Application Publication No. HEI-6-122153 discloses a laminating apparatus for laminating sheet-like objects. The apparatus includes a sheet pick-up roller, first and second detection sensors, and a pair of pressure/thermal rollers, all disposed in this order with respect to a sheet transport direction. That is, the second detection sensor is disposed further downstream than the first detection sensor, although both are disposed upstream from the pressure/thermal rollers. The first and second sensors are for detecting sheets to be laminated. A shutter is disposed between the sensors.

When the second detection sensor detects the front edge of a first sheet, and the first detection sensor detects the next sheet, then the laminating device recognizes that consecutive laminating processes are to be performed on two sheets. In this case, the shutter functions to prevent the subsequent sheet from being drawn with the prior sheet toward the laminating unit. Also, once a predetermined duration of time elapses after the second detection sensor detects the rear edge of the first sheet, then the shutter is retracted upward away from the second sheet. The pick-up roller is lowered onto the second sheet and driven to convey the second sheet to the pressure/thermal rollers. This time ensures that the sheets are separated by a fixed distance.

Also, this laminating apparatus discharges subsequent laminates with the laminate sheet connected between adjacent targets of lamination. This reduces the length (in the sheet transport direction) of the laminate portion comprising only laminate web, that is, the portion of the laminate that extends perpendicular to the transport direction with no target sheet sandwiched therebetween.

SUMMARY OF THE INVENTION

In order to set the timing for transporting the subsequent sheet, the pickup roller for intermittently transporting one sheet at a time must be provided. Also, the shutter for restricting the front edge of the second sheet introduced in between the first and second sensors must also be provided. Also, operation of the pickup roller and shutter must be controlled. As a result, this conventional laminating device has a great number of components and also complicated control operations so that production costs are high.

Because the prior and subsequent sheets remain connected by web as described above, the user must pick up a pair of scissors and the like to cut the laminate sheets between the adjacent targets of lamination, which takes time and effort on the part of the user. It is desirable if the laminates could be laterally out automatically.

It is a first object of the present invention to provide a laminating apparatus capable of consecutive laminating operations using a simple configuration and control method.

It is a second object of the present invention to provide a laminating apparatus capable of automatically cutting laminates in their widthwise direction after being subjected to consecutive laminating processes.

To achieve the above-described objectives, a laminating apparatus according to the present invention includes introduction-side transport rollers, a web supply unit, a laminate processing unit, a detector, and a consecutive lamination control unit.

The introduction-side transport rollers transport objects to be laminated in a transport direction The web supply unit supplies a pair of webs.

The laminate processing unit adheringly laminates the pair of webs onto upper and lower surfaces of the objects.

The detector is disposed between the introduction-side transport rollers and the web supply unit. The detector detects a. front edge of objects transported by the introduction-side transport rollers.

When the detector detects a front edge of the prior object transported by the introduction-side transport rollers, the consecutive lamination control unit controls the introduction-side transport rollers and the laminate processing unit to transport and laminate the prior object until a rear edge of the prior object is positioned in the vicinity of the web supply unit. Then after the rear edge of the prior object is positioned in the vicinity of the web supply unit, the consecutive lamination control unit controls the introduction-side transport rollers and the laminate processing unit to stop transport and lamination of the prior object for a predetermined duration of time. Then once the detector detects a front edge of the subsequent object after the predetermined duration of time elapses from stopping transport of the prior object, the consecutive lamination control unit controls the introduction-side transport rollers to transport a subsequent object to the laminate processing unit.

With this configuration, consecutive lamination processes can be performed on a plurality of objects with the objects separated by a predetermined distance. This can be accomplished using an extremely simple configuration and control process. That is, configuration is extremely simple because only a single detector is required. Also, control is simple because only a. simple time-based control is required to stop transport of the preceding object when the detector detects the rear end of the preceding object, and to wait for the predetermined time to elapse after transport is stopped before detecting the front edge of a subsequent object.

According to another aspect of the present invention, the laminating apparatus further includes a lateral cutting unit that cuts in a lateral direction that is perpendicular to the transport direction. The lateral cutting unit is positioned downstream from the laminate processing unit. During a margin mode, the consecutive lamination control unit controls the lateral cutting unit to cut the webs along an imaginary line between the rear edge of the preceding object and the front edge of the subsequent object.

With this configuration, when consecutive lamination processes are performed on two sheets having the same width the lateral cutting unit outs only once along an imaginary line between the rear edge of the preceding object and the front edge of the subsequent object, the imaginary line extending in a direction perpendicular to the transport direction of the objects. Therefore, no residual web is generated when the adjacent objects are cut apart, so that the webs can be fully used without waste. Also, lamination processes can be quickly performed.

According to another aspect of the present invention, the laminating apparatus further includes a pair of discharge rollers provided downstream from the lateral cutting unit in the transport direction. The distance between the discharge rollers and the lateral cutting unit is set shorter than a length of margin residues strips out from laminates by the lateral cutting unit.

With this configuration, residual web generated from cutting laminates will always be held between the discharge rollers after cut away from a laminate by the lateral cutting unit, and so will be reliably discharged from the lamination apparatus by the discharge rollers.

According to another aspect of the present invention, the laminating apparatus further includes an indication unit that visually indicates elapse of time by dividing the predetermined duration of time into substantial front and rear halves when the consecutive lamination control unit controls to perform consecutive lamination.

With this configuration, the user can insert a subsequent object while viewing the indication unit, and can easily know that it is possible to perform consecutive lamination processes.

According to another aspect of the present invention. the laminating apparatus further includes an operation panel including a mode setting switch. The mode setting switch is for selectively setting a single item process mode for laminating single sheets at a time; a consecutive laminate process routine; and a binder mode for forming laminates with a large-width margin portion downstream with respect to. the transport direction.

With this configuration, users can easily switch between three different types of lamination processes as the user desires.

BRIEF DESCRIPTION OF THE DRAWINGS

The above and other objects, features and advantages of the invention will become more apparent from reading the following description of the embodiment taken in connection with the accompanying drawings in which:

FIG. 9(*b*) is a schematic view showing relationship between a POWER OFF mode position of the rotary knob and positions of components in the link mechanism;

FIG. 9(*c*) is a schematic view showing relationship between a MARGIN mode position of the rotary knob and positions of components in the link mechanism;

FIG. 9(*d*) is a schematic view showing relationship between a NO MARGIN mode position of the rotary knob and positions of components in the link mechanism:

FIG. 14(*b*) is a schematic view showing cutting positions during a NO MARGIN mode when two consecutive sheets have the same width;

FIG. 14(*c*) is a schematic view showing cutting positions during a MARGIN mode when two consecutive sheets have different widths;

FIG. 14(*d*) is a schematic view showing cutting positions during a BINDER mode.

DETAILED DESCRIPTION OF THE EMBODIMENT

Next, an explanation of a laminating apparatus according to an embodiment of the present invention will be described while referring to the attached drawings.

Figure 1:
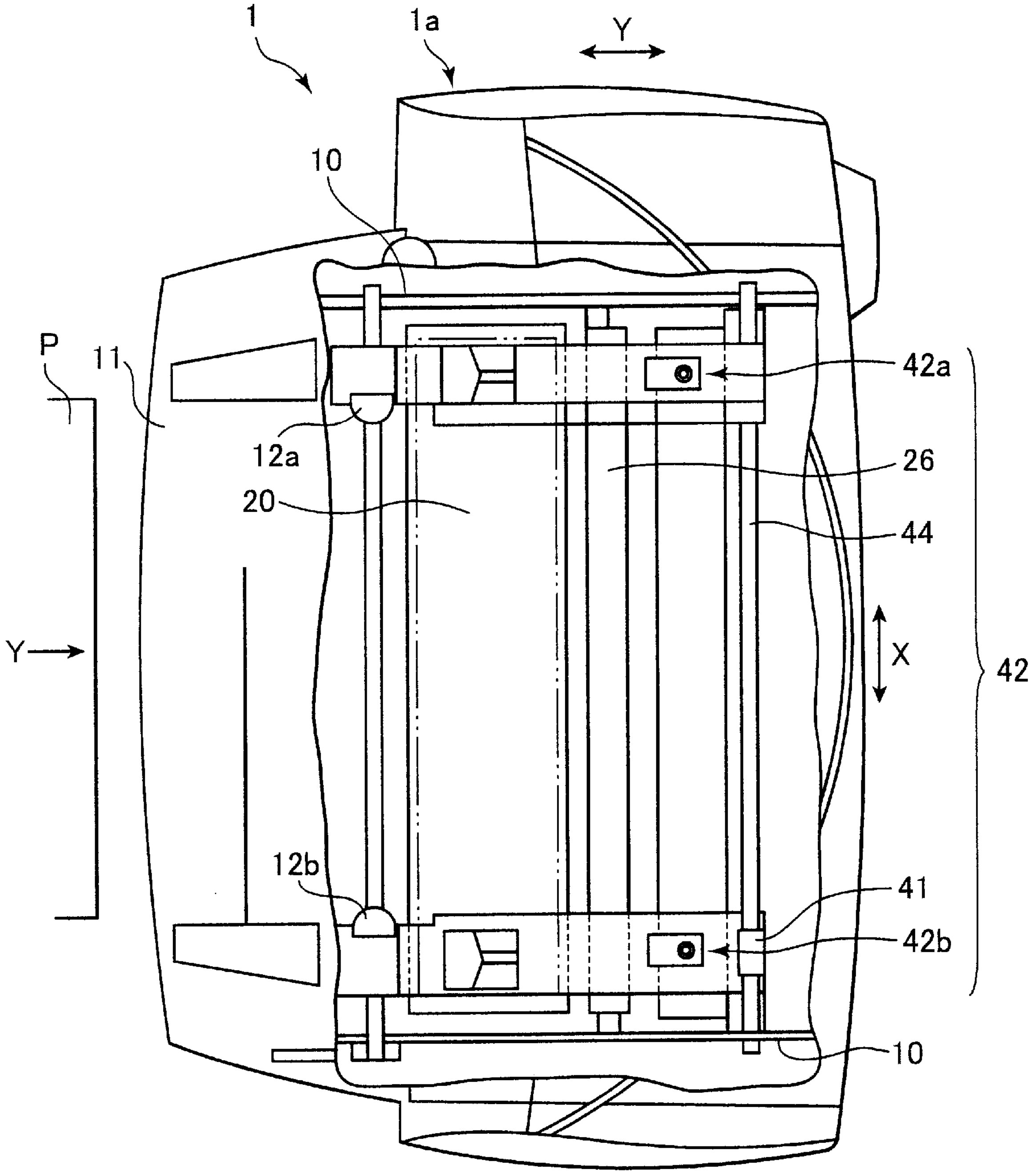
FIG. 1 is a plan view showing a laminating apparatus according to an embodiment of the present invention, with a portion of an external case cut out to enable viewing internal components.
Figure 2:
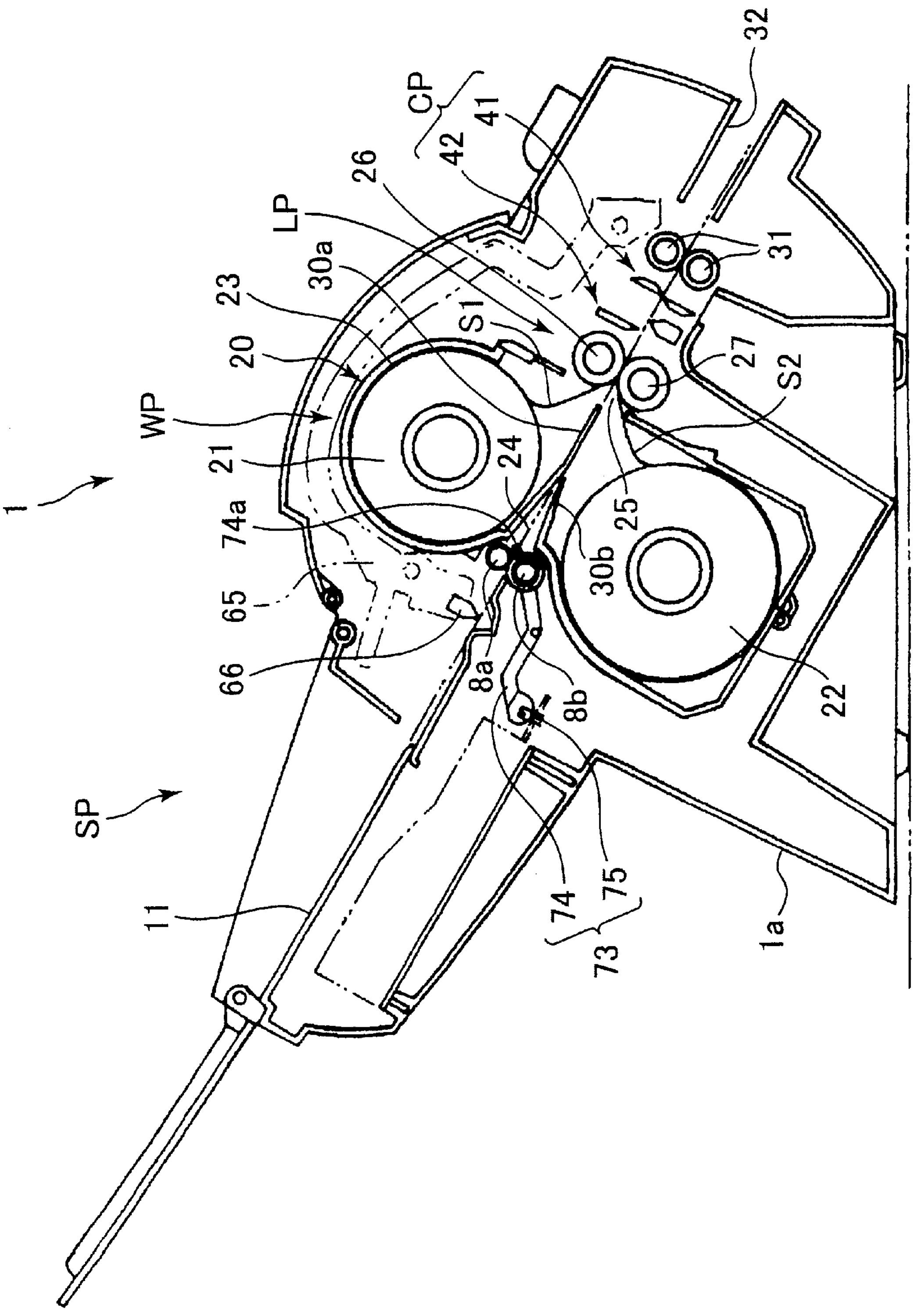
FIG. 2 is a cross-sectional side view showing the laminating apparatus of FIG. 1.

As shown in FIG. 1, a laminating apparatus 1 according to the present embodiment includes a case 1*a* formed from synthetic resin. As shown in FIG. 2, the laminating apparatus 1 includes a sheet supply portion SP for supplying an sheets P, such as a document or a card represented by sheet P hereinafter, a web supply portion WP for supplying laminating webs S1, S2 for laminating the sheet P, a laminating portion LP that operates to sandwich the sheet P supplied from the sheet supply portion between the webs S1, S2, and a cutting portion CP that cuts the laminate discharged from the laminating portion LP.

As shown in FIGS. 1 and 2, the sheet supply portion SP includes a sheet supply tray 11 and a pair of sheet supply rollers 8*a*. 8*b*. The sheet supply tray 11 is disposed at the upper left hand portion of the case 1*a* as viewed in FIG. 2.

The sheet supply tray 11 includes a flat surface, on which sheets P are stacked as target objects to be laminated, and sheet guides 12*a*, 12*b* for positioning the sheets P in the widthwise direction. At least one of the sheet guides 12*a*, 12*b* are supported movable in the x-wise directions to enable freely adjusting distance between itself and a wall surface of the case 1*a*.

Figure 3:
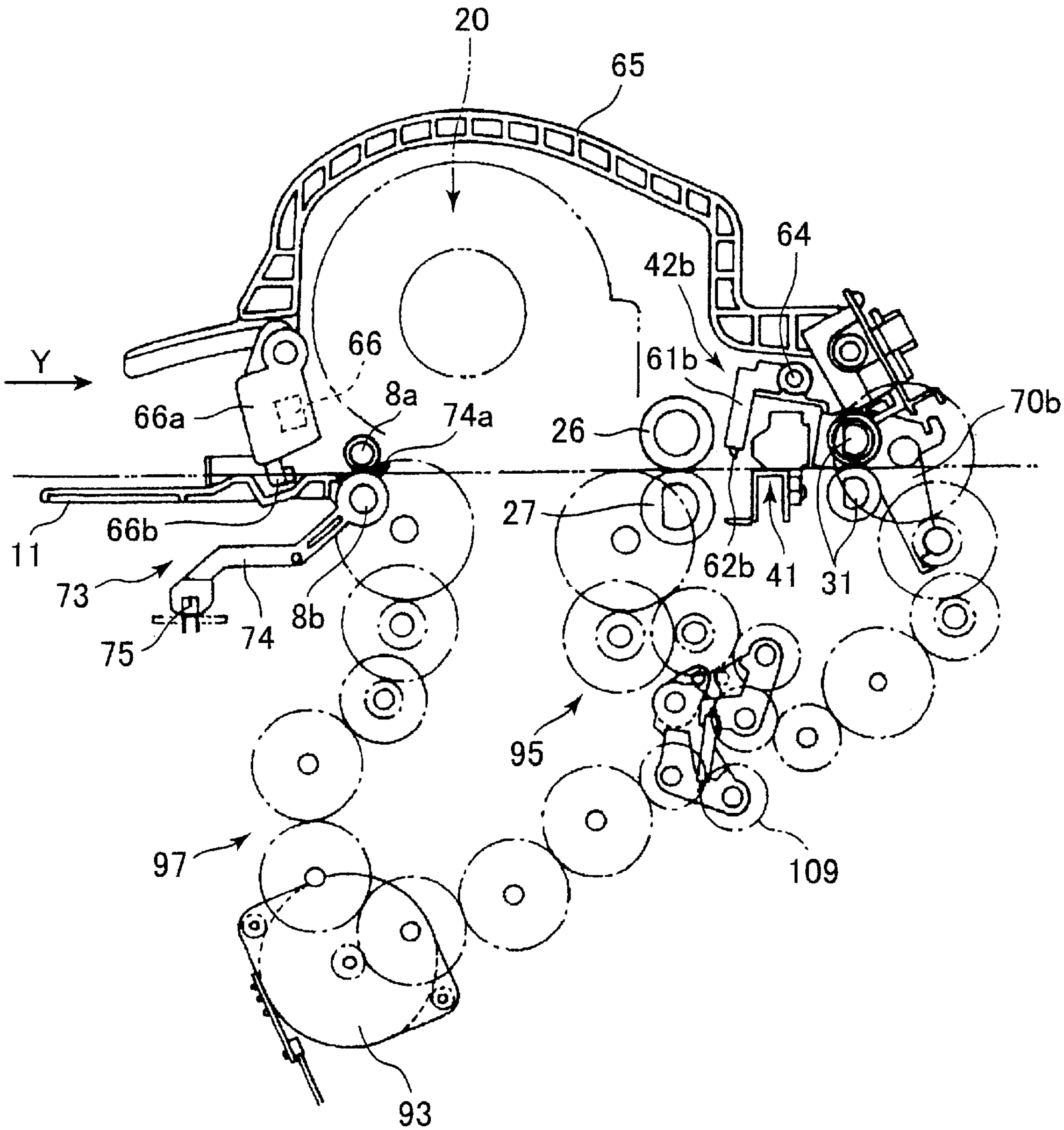
FIG. 3 is a cross-sectional view taken from the left side, that is, with respect to viewing the side of the laminating apparatus 1 that discharges the laminates and schematically showing distribution of components upstream and downstream from a web cassette with respect to the transport direction of the sheets.

The pair of sheet supply rollers 8*a*, 8*b* are rotatably supported on shafts 10. which are positioned at left and right hand sides of the laminating apparatus 1. As shown in FIG. 2, the sheet supply rollers 8*a*, 8*b* are disposed between the base end of the sheet supply tray 11 and the sheet entrance of a web cassette 20 (to be described later) of the web supply portion WP. As shown in FIG. 3, a drive motor 93 is provided for supplying drive force, and a transmission gear mechanism 97 is provided for transmitting drive force from the drive motor 93 to one end of the shaft of the sheet supply roller 8*b*. The transport drive motor 93 can be a stepping motor, and is capable of driving in forward and reverse directions. Gear trains are also provided for transmitting drive force from the drive motor 93 to the pinch rollers 26, 27 and the discharge rollers 31. That is, a transmission gear mechanism 95 is provided for transmitting drive force to the pinch rollers 26, 27. A clutch mechanism 109 is provided at the feed side of the transmission gear mechanism 95. The clutch mechanism 109 is formed from a cam or planetary gear for example. The clutch mechanism 109 can be switched so that drive force from the motor 93 is transmitted to the pinch rollers 26, 27 and blocked to the discharge rollers 31. By further switching the clutch mechanism 109, all of the rollers 8*a*, 8*b*, 26, 27, and 31 can be driven at the same time, or the rollers 8*a*, 8*b*, 31 can be selectively driven simultaneously.

The web supply portion WP includes the web cassette 20, as mentioned previously. The web cassette 20 is freely detachably mounted in a cassette housing portion, which has an open upper surface. The web cassette 20 is positioned to laminate the sheet P, with the right side of the sheet P as a reference. In this case, "right" side of the sheet P refers to the sheet P as viewed from the sheet discharge slot of the case 1*a*. The web cassette 20 includes a housing 23 that houses two web rolls 21, 22, with the web roll 21 disposed above the web roll 22. The housing 23 is formed from a front and rear pair of cases, and is formed with a sheet insert port 24 and a sheet feed-out port 25. The sheet insert port 24 is formed extending laterally at the front end of the housing 23, and serves to feed in sheets P between the web rolls 21, 22. The sheet feed-out port 25 is formed in the rear of the housing of the web rolls 21, 22, and functions to feed out a sheet fed in from the sheet insert port 24 and the webs S1, S2 fed out from the web rolls 21, 22, respectively, to a pair of pinch roller 26, 27 of the laminating portion LP. Although not shown in the drawings, a pair of upper and lower shutters for opening and closing the sheet feed-out port 25 are provided at the sheet feed-out port 25.

The housing 23 is also formed with a pair of upper and lower guide plates 30*a*, 30*b* that extend from the sheet insert port 24 toward the sheet feed-out port 25. The guide plates 30*a*, 30*b* form a guide path for guiding the sheet P from the sheet insert port 24 toward the sheet feed-out port 25. According to the present embodiment, the guide plates 30*a*, 30*b* have different lengths. That is, the lower guide plate 30*b* is shorter than the upper guide plate 30*a*. Although not shown in the drawings, a resin spring plate is attached to the lower guide plate 30*b* for positioning the sheet P by pressing the sheet P up against the upper guide plate 30*a*.

The web rolls 21, 22 are wrapped with elongated webs S1, S2, respectively, around their exteriors in a roll condition. The webs S1, S2 have a particular construction. The upper web S1 has a base layer of transparent resin film coated with an adhesive layer on one surface of the resin film. In the present embodiment, the base film of the web S1 is a film of polyethylene terephthalate (PET).

The lower web S2 is a separation film, formed from paper in the present embodiment. That is to say, the web S2 has a base of paper laminated with a material, such as paraffin, for enhancing the separation effect of the web S2. Adhesive layer of the web S1 has adhesive strength sufficient for enabling the web S2 to be easily peeled away from the web S1 after they have been laminated together. The web S2 is thicker than the web S1 so the roll diameter of the lower web roll 22 is larger than the roll diameter of the upper web roll 21 when both webs S1, S2 are the same length. It should be noted that the web S2 can be Configured from materials other than a separation sheet with a base layer of paper. For example, the web S2 can be made from a transparent web with a resin base having good separability.

The web rolls 21, 22 are rotatable supported within the housing 23 so that the webs S1, S2 are fed out from the sheet feed-out port 25 of the web cassette 20 with the adhesive surface of the web S1 facing the separation surface of the web S2.

The laminating portion LP includes a pair of upper and lower pinch rollers 26, 27 as mentioned above. The lower pinch roller 27 is rotatably supported on the left and right shafts 10. The lower pinch roller 27 is a drive roller driven to rotate by drive force from the transport drive motor 93 as transmitted through the gear mechanism 97. The upper pinch roller 26 and the lower pinch roller 27 are connected by gears (not shown). Therefore, the upper pinch roller 26 is driven to rotate in synchronization with the lower roller 27.

Here, operation of the laminating portion LP will be described. As described above, the web S1 has a transparent resin web layer as its base and this base is laminated on one side with adhesive layer, and the web S2 is a separable paper web. The upper pinch roller 26 presses the web S1 down against the upper surface of the sheet P so that the film layer of the web S1 adheres to the upper surface of the sheet P through the adhesive layer of the web S1. Also, lower pinch roller 27 presses the web S2 against the underside of the sheet P. However, because the web S2 is only a separation type sheet layer, the web S2 will not adhere to the sheet P. If the webs S1, S2 are wider than the sheet P, then the webs S1, S2 will protrude beyond the edge of the sheet P in the widthwise direction of the sheet P. In this case, the adhesive layer of the web S1 will adhere to the separation sheet layer of the web S2 at this protruding portion. Therefore, the webs S1, S2 and the sheet P will be formed into a substantially integral laminate R shown in FIG. 11. The laminate R is transported from the laminating portion P to the cutting portion CP.

The cutting portion CP includes a lateral cutting unit 41 and a longitudinal cutting unit 42. The lateral cutting unit 41 follow a guide rail 44 to move reciprocally in the X directions indicated in FIGS. 1, 5, and 11. The lateral cutting unit 41 functions to cut the laminate R following the X directions. The longitudinal cutting unit 42 cuts the left and right edges of the laminate R following the transport direction of the laminate R, that is, following Y directions shown in FIGS. 1, 7, and 11. The cutting portion CP includes a reference-side longitudinal cutting unit 42*a* and an other-side longitudinal cutting unit 42*b*.

According to the present embodiment, the right side of the sheet P, that is, the right side when viewing the discharge side of the laminating apparatus 1, is used as the reference for aligning sheets P, particularly when introducing the sheets P into the web cassette 20. Therefore, the reference-side longitudinal cutting unit 42*a* is disposed on the reference-side, that is, the right side. The other longitudinal cutting unit 42*b* is disposed on the left hand side as viewed in the discharge portion of the laminating. apparatus 1.

Figure 7:
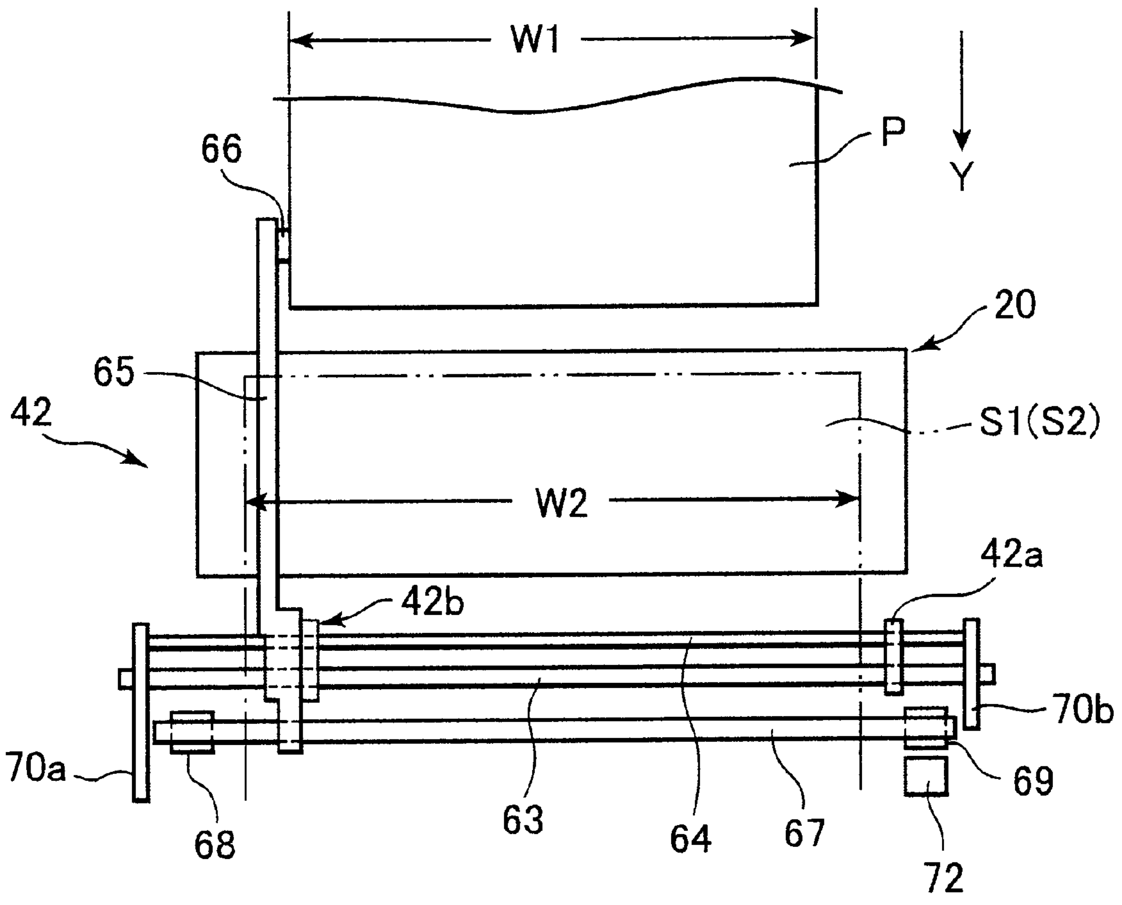
FIG. 7 is a plan view showing configuration of a longitudinal cutting unit.
Figure 11:
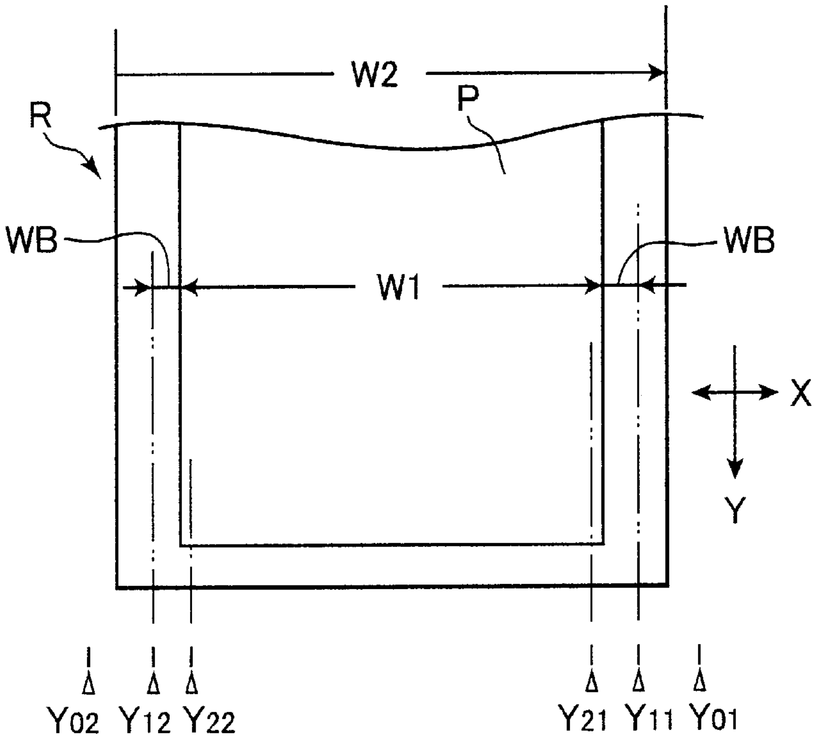
FIG. 11 is a schematic view showing positions of cutting units with respect to a laminate during each of the modes shown in FIGS. 9(*a*) to 9(*d*)

As shown in FIGS. 7 and 11, the webs S1, S2 are set with a width W2 greater than the width W1 of the sheet P. When the user indicates that the laminate R is to be. discharged with the same width as the webs S1, S2, the reference-side longitudinal cutting unit 42*a* and the other-side longitudinal cutting unit 42*b* are positioned beyond the width W2 of the laminate R. Hereinafter, discharging the sheet as is, with the width of the webs S1, S2, will be referred to as no cut hereinafter.

The reference-side longitudinal cutting unit 42*a* and the other-side longitudinal cutting unit 42*b* are set at predetermined positions for a MARGIN mode or a NO MARGIN mode. In the MARGIN mode, the cutting units 42*a*, 42*b* cut the left and right edges of the webs S1, S2 by an amount that maintains a margin that equals the width W1 of the sheet P plus a width WB shown in FIG. 11. In the NO MARGIN mode, the cutting units 42*a*, 42*b* cut a slim width from widthwise left and right edges of the sheet P itself, so that the laminated condition of the webs S1, S2 does not stand out when the laminate R is viewed in plan.

Transport of the laminate R proceeds to a predetermined position in the Y directions, that is, in the transport direction of the sheet P, until the laminate R reaches the cutting position of the lateral cutting unit 41, whereupon the lateral cutting unit 41 cuts the laminate R the X directions and the discharge rollers 31 transport the laminate R out through the discharge port 32.

Figure 4:
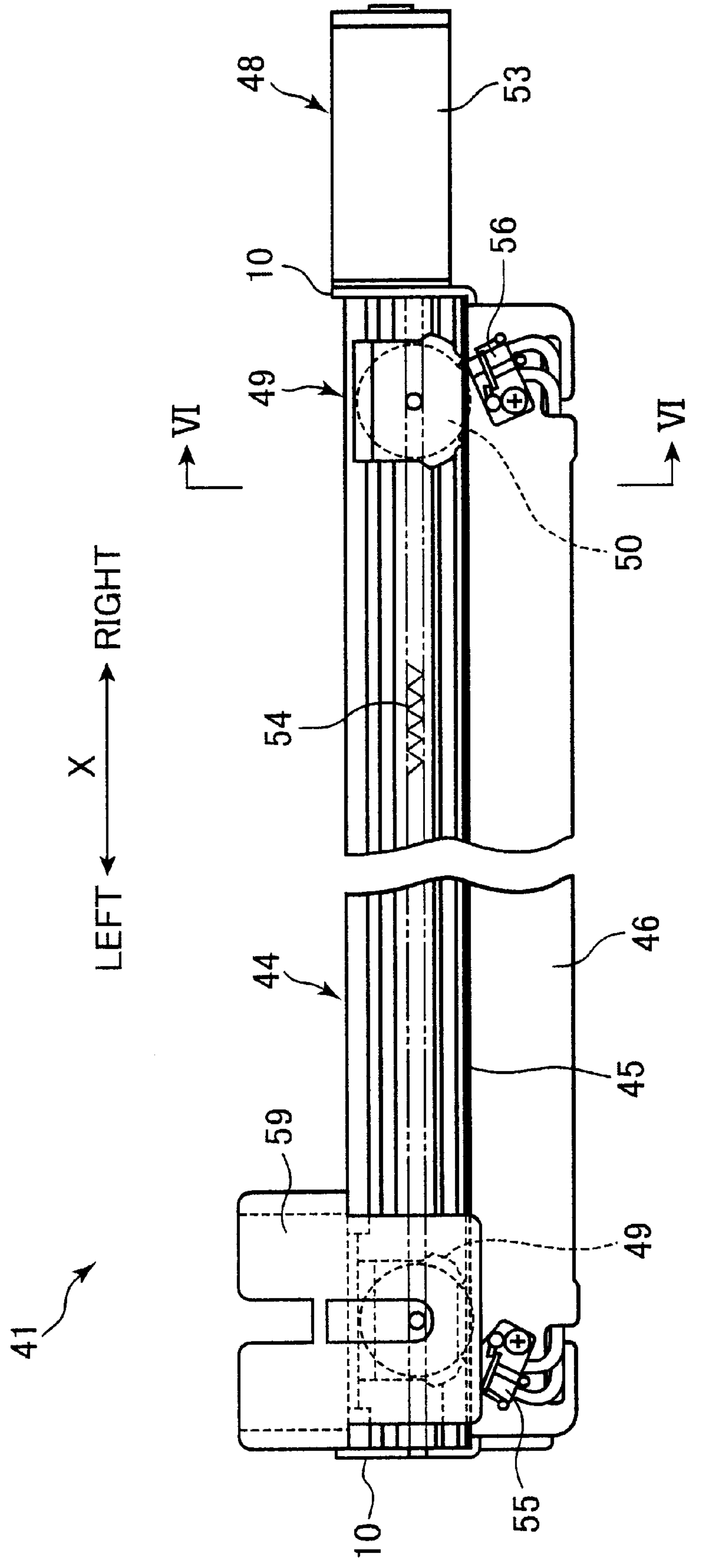
FIG. 4 is a front view showing overall configuration of a rotary lateral cutter unit of the laminating apparatus.
Figure 5:
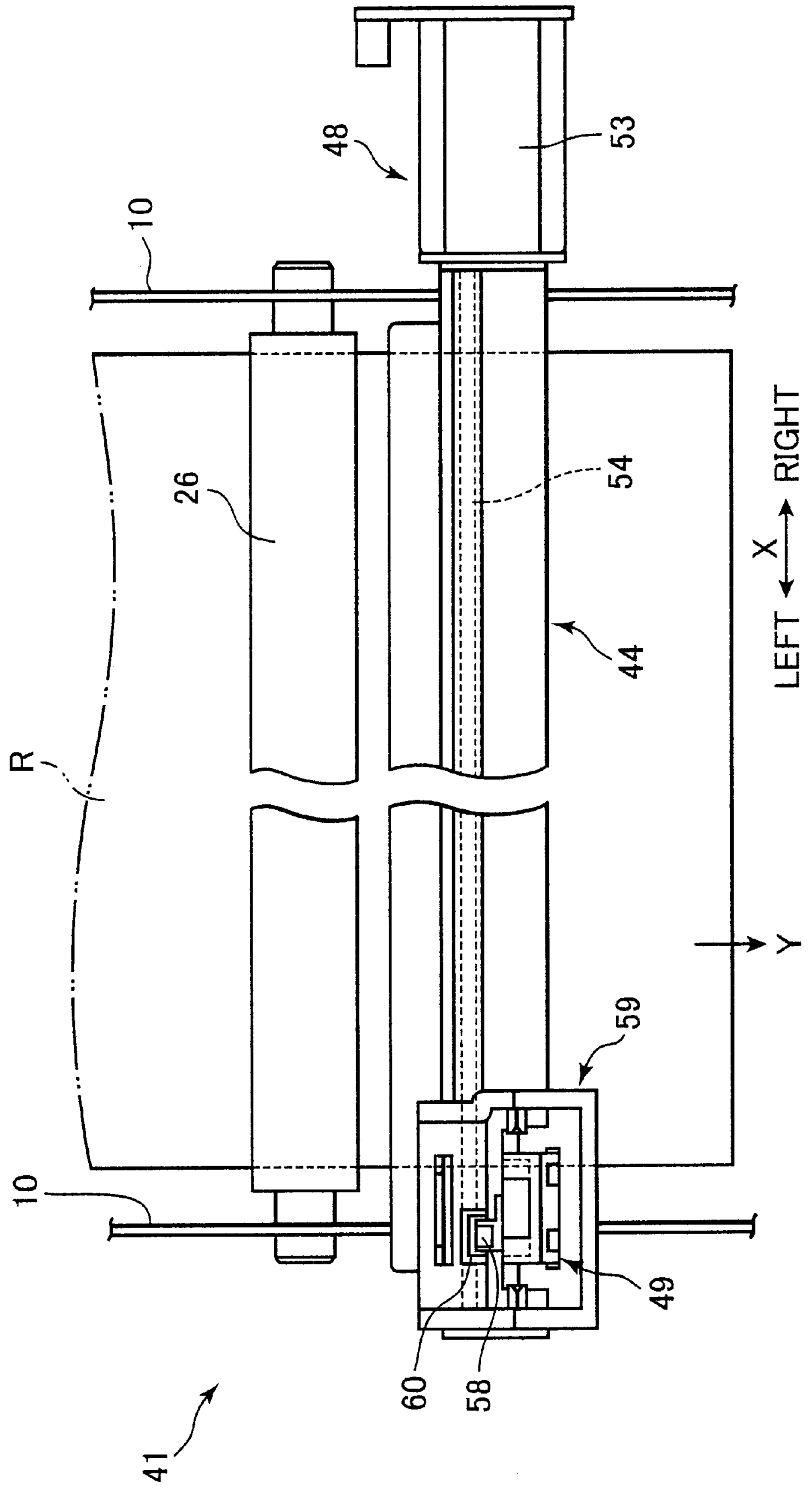
FIG. 5 is a partial plan view showing position of a cutter carriage of the lateral cutter unit on a detachable frame.

Next, the lateral cutting unit 41 will be described in more detail while referring to FIGS. 4 to 6. As shown in FIGS. 4 and 5, the lateral cutting unit 41 includes a guide rail 44, a fixed blade 45, a support chassis 46, a left and right pair of support chassis 10, 10, a cutter carriage 49, and a drive unit 48. The guide rail 44 Is made from metal and is disposed in a horizontal posture between the support chassis 10, 10. The fixed blade 45 is made from metal plate disposed below the guide rail 44. The fixed blade 45 also serves as a guide plate. The support chassis 46 supports the fixed blade 45. The cutter carriage 49 is made from a synthetic resin material and mounted with a rotary blade 50. The cutter carriage 49 is fitted at the one end of the guide rail 44 in the guide groove of the guide rail 44, so as to be movable in the X directions following the guide groove. The drive unit 48 drives the cutter carriage 49 to move reciprocally in the X directions.

Figure 6:
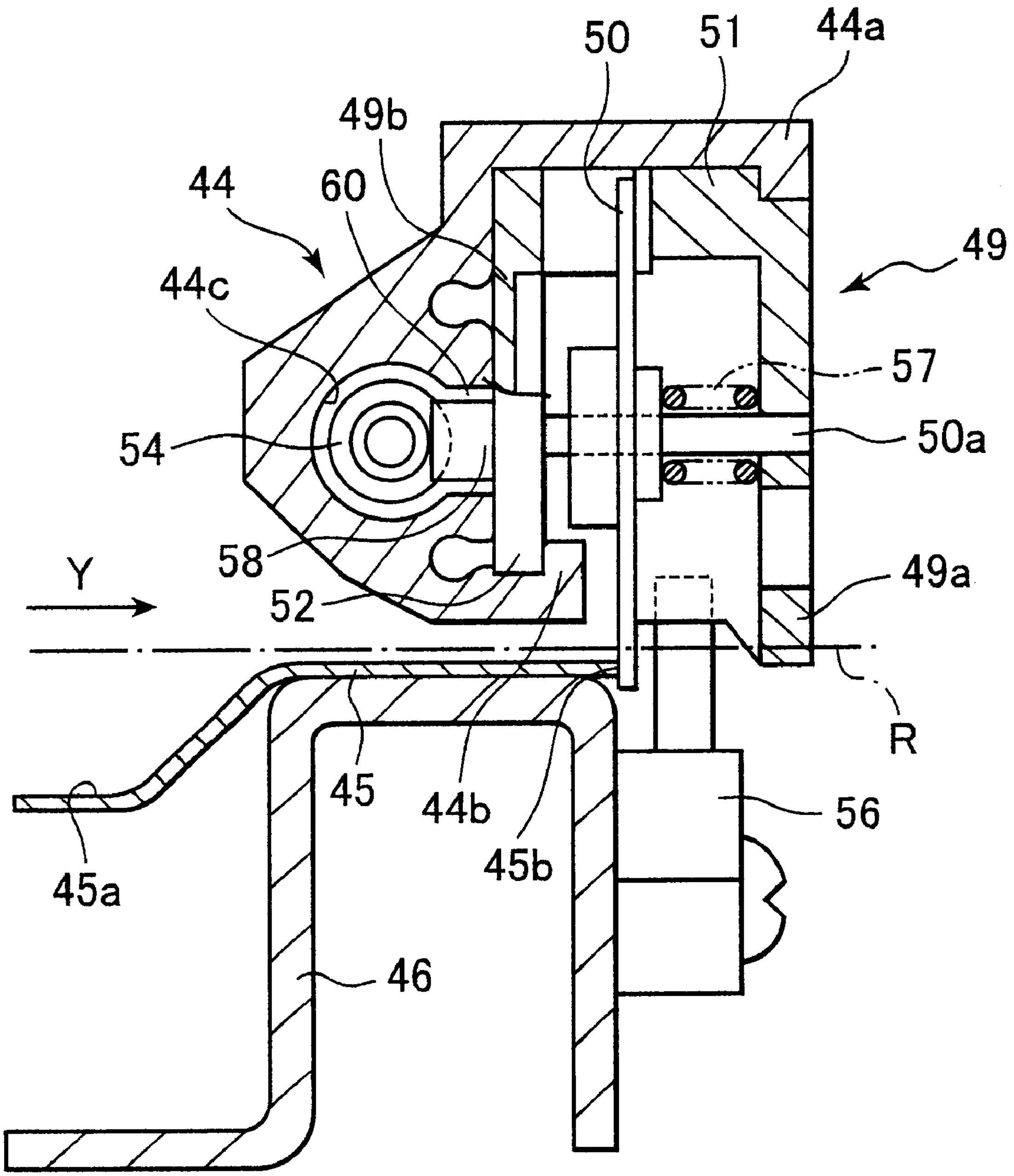
FIG. 6 is an enlarged cross-sectional view taken along a line VI—VI of FIG. 4.

As shown in FIG. 6, the fixed blade 45 is supported on the upper surface of the support chassis 46. The fixed blade 45 includes a sheet guide portion 45*a* and a blade portion 45*b* at opposite ends thereof with respect to the transport direction in which the laminate R is transported, which is one of the Y directions. The sheet guide portion 45*a* is formed by a downward bend in the fixed blade 45 at a position downstream from the upper surface of the support chassis 46. The blade portion 45*b* is formed by the edge of the fixed blade 45 that is downstream from the support chassis 46 in the transport direction, and that abuts against the side surface of the rotary blade 50. The guide rail 44 made from a metal material, such as aluminum pressed out member. The guide rail 44 includes integral upper and lower rail portions 44*a*, 44*b* and a guide slot portion 44*c*. The upper and lower rail portions 44*a*, 44*b* together form a substantial C shape in cross-section and are slidably fitted with upper and lower guide protrusion portion 51, 52, respectively of the cutter carriage 49. The guide slot portion 44*c* is formed between the upper and lower rail portions 44*a*, 44*b*, that is, substantially centered vertically between the upper and lower rail portions 44*a*, 44*b*. The guide slot portion 44*c* has an open edge. A spiral coil shaft 54 is fitted in the guide slot portion 44*c*. The spiral coil shaft 54 is connected to the cutter motor 53 and driven to produce a spiraling motion. The cutter motor 53 is a direct current motor capable of forward and reveres rotation and a part of the drive unit 48.

Limit sensors 55, 56 are disposed at left and right ends of the support chassis 46. The limit sensors 55, 56 are limit switches, for example, for detecting movement limits of the cutter carriage 49 in the widthwise direction of the sheet, that is, in left and right directions as viewed in FIG. 4. In the present embodiment, the home position is determined when the leftmost limit sensor 55 detects the cutter carriage 49. When the cutter carriage 49 is detected by the rightmost limit sensor 56, then the cutter motor 53 is driven to rotate reverse so that the cutter carriage 49 is moved back to the home position at the left end as viewed in FIGS. 4 and 5.

The cutter carriage 49 is made from front and rear side plates 49*a*, 49*b*, which are connected at upper ends by the upper end guide protrusion portion 51. The front and rear side plates 49*a*, 49*b* support both ends of a support shaft 50*a* on which the rotary blade 50 is supported. The lower edge and the left and right ends of the front and rear side plates 49*a*, 49*b* are open. At least the lower rounded edge of the rotary blade 50 is exposed out through this open lower edge of the side plates 49*a*, 49*b*. An urging coil spring 57 is located between the side surface of the rotary blade 50 and the inner surface of the front side plate 49*a*. With this configuration, the rotary blade 50 is slidingly pressed against the blade portion of the fixed blade 45 by the coil spring 57.

An engagement protrusion portion 58 protrudes horizontally outward from the rear side plate 49*b* from the surface of the rear side plate 49*b* into confrontation with the guide slot portion 44*c* of the guide rail 44, and into engagement with the spiral portion of the spiral coil shaft 54. As shown in FIGS. 4 and 5, a detachment guide frame 59 is formed at one side of the guide rail 44 in the lengthwise direction of the guide rail 44. According to the present embodiment, the detachment guide frame 59 is formed at the home position, which is the left end of the guide rail 44 as viewed in FIGS. 4 and 5. The detachment guide frame 59 is made from a synthetic resin material and is for detaching the cutter carriage 49 when exchanging the cutter carriage 49. A cutout indentation 60 is formed in the guide rail 44 from the upper rail portion 44*a* to the guide slot portion 44*c* so as to intersect in the lengthwise direction of the guide rail 44. The cutout indentation 60 enables the engagement protrusion portion 58 to pass therethrough by the guide slot portion 44*c* when detaching or engaging the spiral coil shaft 54 during exchange of the cutter carriage 49.

Next, configuration of the longitudinal cutting unit 42 will be described while referring to FIGS. 2, 3, and 7 through 10. As mentioned previously, the longitudinal cutting unit 42 includes the reference-side longitudinal cutting unit 42*a* and the other-side longitudinal cutting unit 42*b*. According to the present embodiment, the right side, that is, as viewed from the discharge side of the laminating apparatus 1, is used as the reference for positioning the sheet P. such as with respect to the web cassette 20 when inserting the sheet P. Accordingly, the position of the reference-side longitudinal cutting unit 42*a* is on the right side (reference-side) as shown in FIG. 1. The other-side longitudinal cutting unit 42*b* is disposed at a position on the left side as viewed from the discharge side of the laminating apparatus 1. Each longitudinal cutting unit 42*a* (42*b*) includes a synthetic resin support body 61*a* (61*b*) and a knife shaped cutters 62*a* (61*b*). The knife shaped cutters 62*a*, 61*b*, are supported on the support bodies 61*a*, 61*b*, so as to protrude downward from the lower end of the corresponding support body 61*a*, 61*b*.

A photo sensor 66 serving as a second sensor is provided upstream in a transport direction from the center of the nip between the sheet feed rollers 8*a*, 8*b*, that is to near the side of the sheet feed rollers 8*a*, 8*b* at the sheet feed tray 11. The photo sensor 66 functions to detects presence and absence of a sheet and also functions to detect width of the sheet.

As shown In FIGS. 2 and 3, an introduced sheet sensor 73 serving as a first detector for detecting presence and absence of introduced sheets is provided between the insert port 24 of the web cassette 20 and the center of the nip between the sheet feed rollers 8*a*, 8*b*, that is, for example near the side of the sheet feed rollers 8*a*, 8*b*. The introduced sheet sensor 73 includes an arm 74 and electrical sensor 75. The arm 74 is freely rotatably supported on the shaft of the lower sheet supply roller 8*b*. The upper edge detection portion 74*a* of the arm 74 protrudes into the sheet transport pathway of the sheet P. The lower end of the arm 74 protrudes into the electrical sensor 75, which can be a photo sensor or proximity sensor. When the front edge of the sheet P presses against the detection portion 74*a*, the detection portion 74*a* pivots around the arm 74, so that the lower end of the arm 74 separates from the electrical sensor 75. This results in determination that a sheet exists. In association with passage of the sheet P, the front and rear edges of the sheet P are detected, so that the length of the sheet P can be measured.

Figure 13:
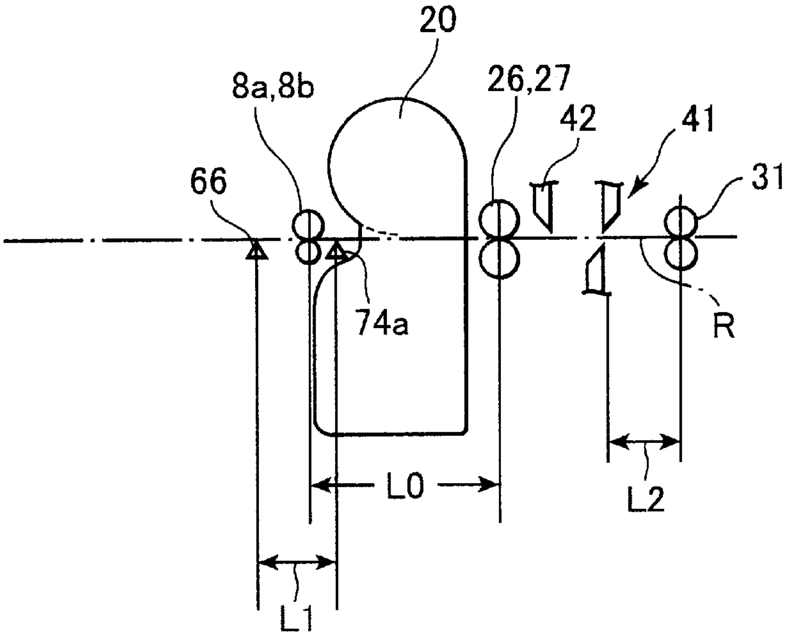
FIG. 13 is a side view schematically showing positional relationship of different sensors for judging length of a sheet to be laminated.

As shown in FIG. 13, the distance L0 from the nip center between the sheet feed rollers 8*a*, 8*b* to the nip center of the pinch rollers 26, 27 is set shorter than the distance L1, which is 10 mm in the present embodiment, between the detection portion 74*a* and the photo sensor 66.

As shown in FIG. 7, shafts 63, 64 of the longitudinal cutting unit 42 extend in the X directions. Both of the support bodies 61*a*, 61*b* are fitted on the shafts 63, 64 so as to be freely slidable in the X directions.

As shown in FIG. 7, an arm 65 including a base, a center portion, and a free end, is freely slidably engaged by its base on the guide shafts 63, 64. The support body 61*b* of the other-side longitudinal cutting unit 42*b* is fixed to the base-end side surface of the arm 65. As best seen in FIGS. 1 and 3, the center portion of the arm 65 is formed with a downward-facing concave shape that enables the upper portion of the web cassette 20 to pass through in the X directions. A detector casing 66*a* is mounted on the free end of the arm 65. The detector casing 66*a* houses a photo sensor 66, which serves as a sheet width sensor. A detection lever 66*b* protrudes downward from the detector casing 66*a*. The detection lever 66*b* is swingable with respect to the detector casing 66*a*. When the left edge of the sheet P abuts against the detection lever 66*b*, resultant swinging movement of the detection lever 66*b* is detected by the photo sensor 66 so that the width of the sheet P introduced by way of the sheet supply tray 11 can be measured.

As best seen in FIG. 7, a timing belt 67 which extends in the X directions is disposed above the transport pathway of the laminate R, which is downstream from the sheet feed-out port 25 of the web cassette 20. The timing belt 67 is wrapped around pulleys 68, 69, which are disposed to either side in the widthwise direction of the web cassette 20. A stepping motor 72 is provided for driving the pulley 69 to rotate in forward and reverse directions. The base of the arm 65 is connected to one position of the timing belt 69.

Figure 8:
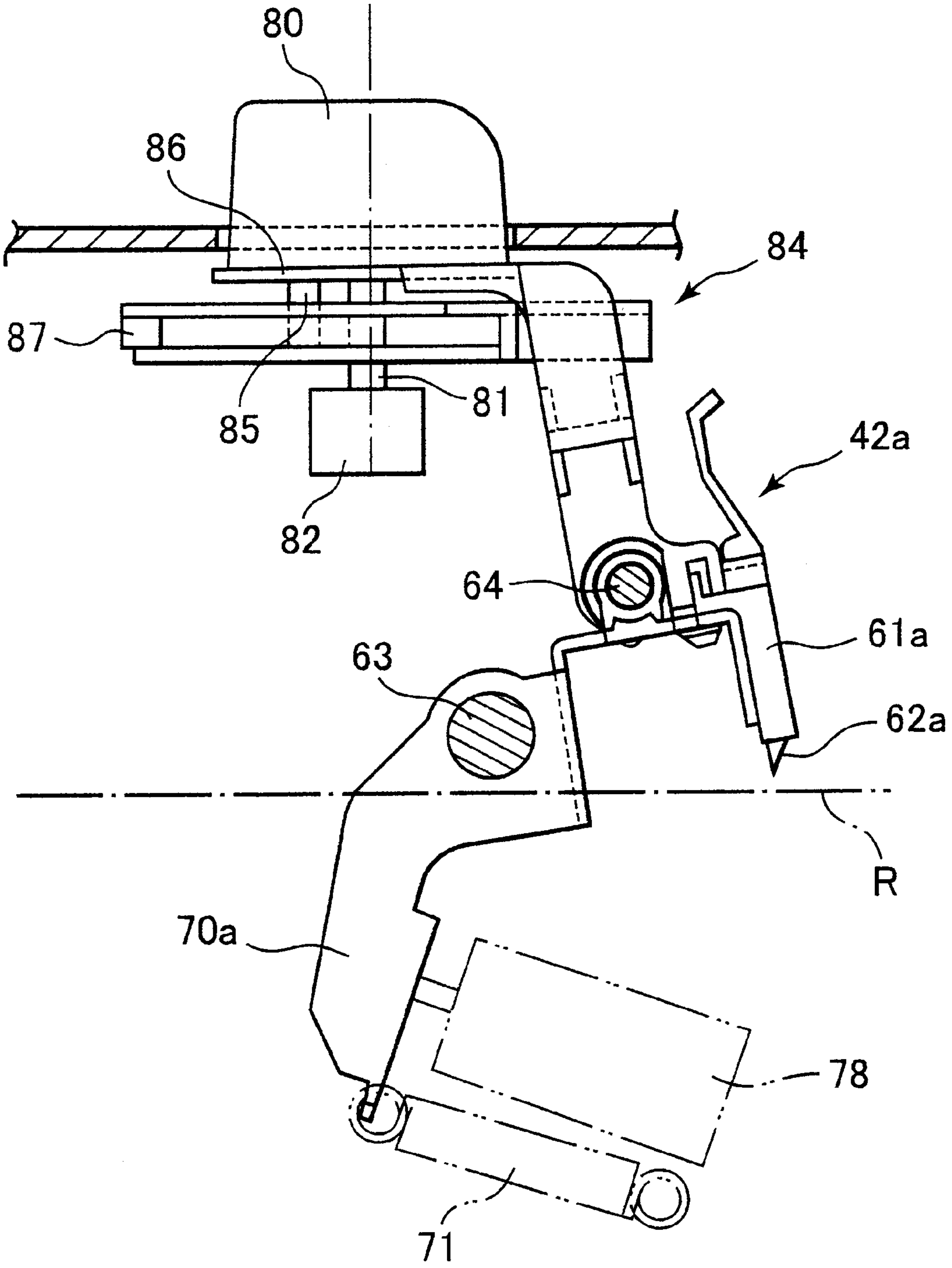
FIG. 8 is an enlarged cross-sectional view showing the reference side, that, is right side, of the longitudinal cutting unit and the power source switch, that is, a rotary knob.
Figure 9A:
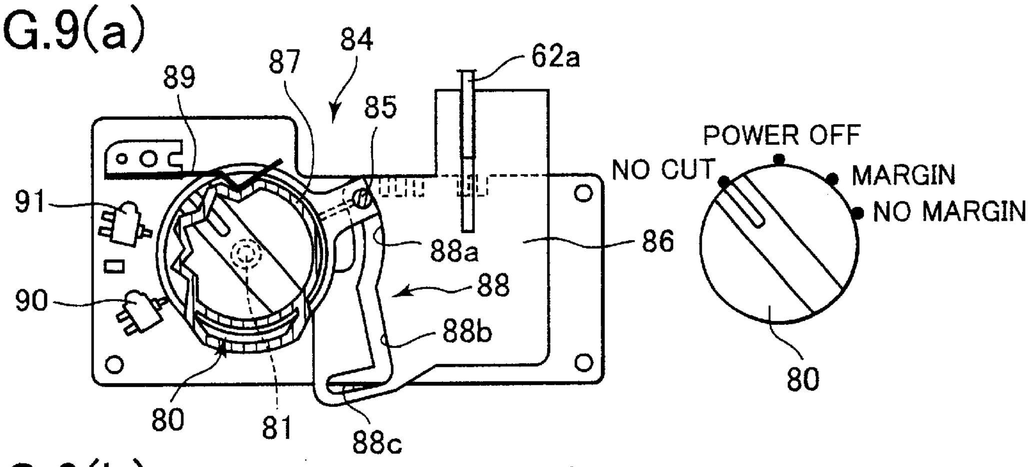
FIG. 9(*a*) is a schematic view showing relationship between a NO CUT mode position of the rotary knob and positions of components in a link mechanism.
Figure 9B:
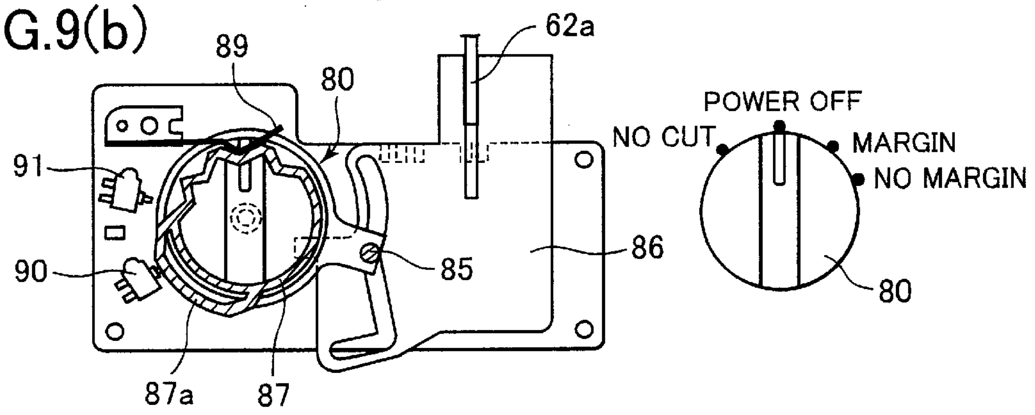
Figure 9C:
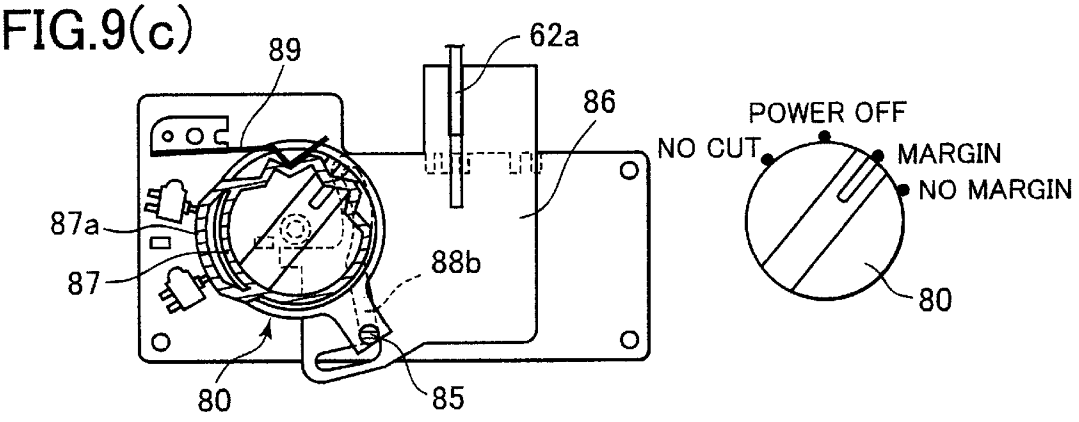
Figure 9D:
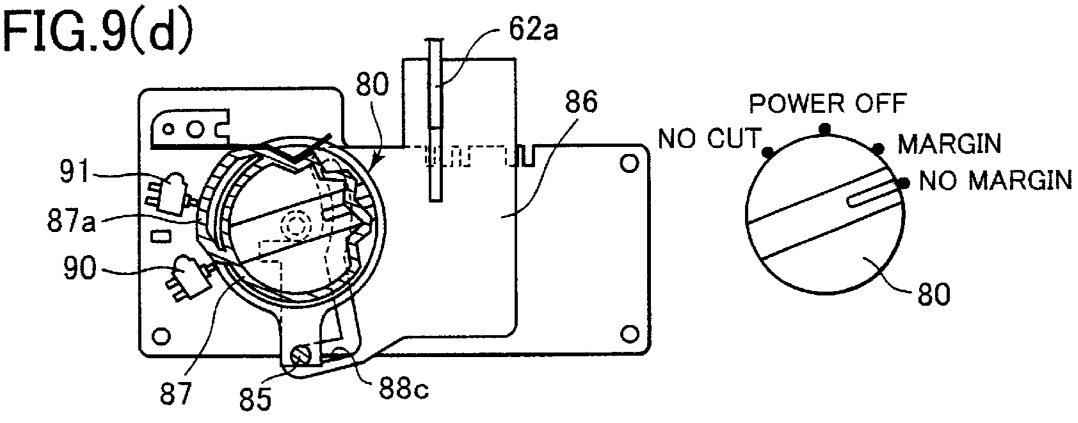

Swing arms 70*a*, 70*b* are connected to the ends of the guide shafts 63, 64 for linking the guide shafts 63, 64 together so that the auxiliary guide shaft 64 is pivotable vertically around the guide shaft 63. As shown in FIG. 8, the right swing arm 70*a* is engaged with the shaft 63 at one end and connected to an urging spring 71 and an actuator 78 at the other. The urging spring 71 pulls to move the right swing arm 70*a* in a direction that separates the cutter 62*a* away from the upper surface of the laminate R. The actuator 78 is, for example, an electromagnetic solenoid. When the actuator 78 is operated, the swinging arm 70*a* pivots against the urging force of the urging spring 71 so that the cutter 62*a* lowers down onto and pierces the laminate R that is being transported. The cutter 62*b* lowers down onto and pierces the laminate R in linking association with movement of the cutter 62*a*.

Next, an explanation will be provided for the control unit of the longitudinal cutting unit 42 while referring to FIGS. 8 to 9(*d*). A rotary knob 80 for turning ON and OFF the power source of the laminating apparatus 1 is disposed on upper surface of the case 1*a*. The rotary knob 80 is integrally formed with a vertically extending shaft 81 and is rotatable about the shaft 81. A rotary power switch 82 is connected to the lower end of the shaft 81 and disposed at a position inside the case 1*a*. The rotary power switch 82 is for turning ON and OFF the power circuit 83. As shown in FIGS. 9(*a*) to 9(*d*), the upper surface of the case 1a is printed with indicia of, from left to right NO CUT, POWER OFF, MARGIN, NO MARGIN, for indicating various modes that can be selected by rotating the rotary power switch 82 to the corresponding position.

A link mechanism 84 shown in FIGS. 8 and 9(*a*) links together the rotary knob 80 and the reference-side longitudinal cutting unit 42*a* so that the reference-side longitudinal cutting unit 42*a* moves In linking association with rotation of the rotary knob 80 into either a retracted position or a longitudinal cutting position depending on the modes selected by position of the rotary knob 80. The link mechanism 84 includes a rotation cam frame 87, an operation shaft 85, and a link plate 86. The rotation cam frame 87 is provided to rotate integrally with the rotary knob 80. The operation shaft 85 is disposed to the outer peripheral side of the rotation cam frame 87, and protrudes downward from the lower surface of the rotary knob 80. The link plate 86 is connected to the support body 61 of the reference-side. longitudinal cutting unit 42*a*, and is formed with a guide slot 88. The operation shaft 85 is fitted in the guide slot 88. The link plate 86 is supported by a guide member (not shown) so as to be reciprocally movable in only the X directions, that is, the widthwise direction of the laminate R.

As shown in FIG. 9(*a*), the guide slot 88 formed in the link plate 86 includes an arch-shaped slot portion 88*a*, a slot portion 88*b*, and a bent linear slot portion 88*c*, which are all continuous with each other. When viewed in plan as in FIG. 9(*a*), the arch shape of the arch-shaped slot portion 88*a* and the movement path of the operation shaft 85 follow the same imaginary circle around the center shaft 81 of the rotary knob 80, when the rotary know 80 is positioned between the NO-CUT mode position and the POWER-OFF mode position. Therefore, when the rotary knob 80 is moved between the NO-CUT mode position and the POWER-OFF mode position, the operation shaft 85 moves within the slot portion 88*a*. Therefore, consequently, the link plate 86 will not be moved by rotation of the rotary knob 80 when the rotary knob 80 is pivoted between the NO-CUT mode position and the POWER-OFF mode position. The linear slot portion 88*b* extends in a direction so that distance between the linear slot portion 88*b* and the shaft 81 of the rotary knob 80 increases with distance along the linear slot portion 88*b* from the arch-shaped slot portion 88*a*. The operation shaft 85 is located in the linear slot portion 88*b* while the rotary knob 80 is between the POWER-OFF mode position and the MARGIN mode position. The bent linear slot portion 88*c* is bent at substantially a right angle, that is, as viewed in plan, with respect to the guide slot 88. The operation shaft 85 is located in the bent linear slot portion 88*c* when the rotary knob 80 is between the MARGIN mode position and the NO-MARGIN mode position.

Accordingly, as shown in FIGS. 9(*a*) and 9(*b*), when the rotary knob 80 is rotated between the NO-CUT and the POWER-OFF mode selection positions, the movement path of the operation shaft 85 is aligned with the arch-shaped of the arch-shaped slot portion 88*a* on the same imaginary circle that is centered on the shaft 81 of the rotary knob 80. Therefore, while the knob is moved from the NO-CUT to the POWER-OFF mode selection positions, the operation shaft 85 moves only within the arch-shaped slot portion 88*a* so that the link plate 86 will not move even though the rotary knob 80 is moved. Accordingly. the cutter 62*a*, which is connected to the link plate 86, will remain at a position Y01 shown in FIG. 11, that is, will remain at the retracted position to the exterior of the right edge of the laminate R.

As shown in FIG. 9(*c*), when the rotary knob 80 is rotated to the MARGIN mode selection position, the operation shaft 85 pivots around the shaft 81 within the linear shaped slot portion 88*b*, and presses against the inner surface of the linear shaped slot portion 88*b*. As a result of this pressing movement by the pivoting operation shaft 85, the link plate 86 moves leftward from the position shown in FIG. 9((*b*) to the position shown in FIG. 9(*c*), and the cutter 62*a* moves accordingly into position Y11 shown in FIG. 11. The position Y11 is the right most position and is separated from right edge of the sheet by a distance WB. In this condition, the webs S1, S2 will be cut be with a right margin having a predetermined width WB.

As shown in FIG. 9(*d*), when the rotary knob 80 is further rotated into the NO-MARGIN mode selection position, the operation shaft 85 moves within the bent linear slot portion 88*c* so as to press against the inner peripheral surface of the bent linear slot portion 88*c*. In accordance with pivoting movement of the operation shaft 85, the link plate 86 moves slightly to the left from the position shown in FIG. 9(*c*) to the position shown in FIG. 9(*d*). As a result, the cutter 62*a* moves to a position Y21 shown in FIG. 11. The position Y21 is slightly to the left of the right edge of the sheet P. As a result, the webs S1, S2 will be cut with no right margin.

As shown in FIGS. 9(*a*) to 9(*d*), the outer surface of the rotation cam frame 87 is formed with protrusions and indentations. The rotation cam frame 87 rotates Integrally with rotation of the rotary knob. A click spring 89 engages in a groove of the rotation cam frame 87 that corresponds to the mode selection position of the rotary knob 80. That is, each time the click spring 89 falls into one of the grooves with rotation of the knob 80, the user will sense a click that indicates that the rotary knob 80 is temporally stopped in place.

The rotation cam frame 87 is provided with a maximum diameter section 87*a*. First and second switches 90, 91 are disposed adjacent to the rotation cam frame 87 so as to selectively abut against the maximum diameter section 87*a* with pivoting movement of the rotary knob 80. A controller 92 to be described later controls rotation of the stepping motor 72 to move the other-side longitudinal cutting unit 42*b* leftward and rightward via the timing belt 67, so that the position of the other-side longitudinal cutting unit 42*b* can be set to a predetermined position based on the output from the first and second selection switches 90, 91.

That is to say, when the rotary knob 80 is located at either the NO-CUT or POWER OFF mode selection position, the controller 92 controls the other-side longitudinal cutting unit 42*b* to move the cutter 62*b* into the Y02 position shown in FIG. 11, that is, to the retracted position to the outside of the left edge of the laminate R. When the rotary knob 80 is rotated to the MARGIN mode selection position, the cutter 62*b* will be moved to position Y12, that is, the position separated by a distance WB from the left edge of the sheet P. In this condition, the webs S1, S2 can be cut with a left margin having the predetermined width WB. When the rotary knob 80 is rotated further to the NO-MARGIN mode selection position as shown in FIG. 9(*d*), the cutter 62*b* will be moved to the position Y22 shown in FIG. 11, that is, at a position slightly to the right of the left edge of the sheet P. As a result, the webs S1, S2 can be out with no left margin.

The controller 92 can be an electric microcomputer including a central processing unit (CPU), a ROM storing predetermined control programs, and a RAM storing a variety of different data types. The controller 92 uses the signal from the sheet width sensor 66 to detect the width of the sheet P introduced into the web cassette 20, and then automatically controls the position of the other-side longitudinal cutting unit 42*b* based on the detected width. The controller 92 also changes the cutting condition of the left and right side longitudinal cutting units 42*a*, 42*b*, controls operation of the lateral cutting unit 41, and executes other programs.

Figure 10:
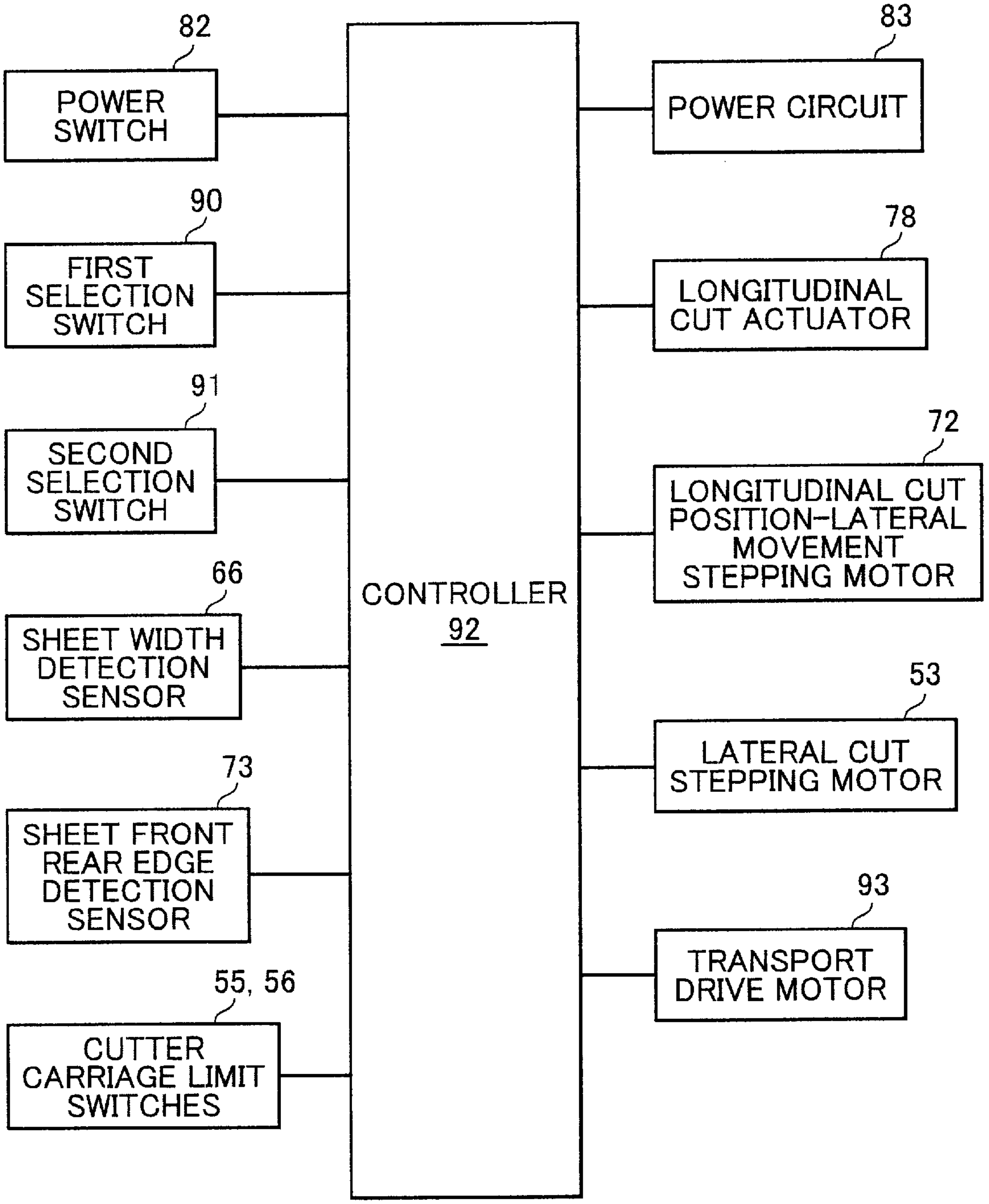
FIG. 10 is a block diagram showing connection of electrical components of the laminating device.

As shown in FIG. 10, the controller 92 is connected to the rotary power switch 82, the first selection switch 90, the second selection switch 91, the photo sensor 66, the paper introduction sensor 73, and the limit switches 55, 56, and receives input signals from all of these elements. Also, the controller 92 is connected to, and drives at a predetermined timing, the power circuit 83, the actuator 78 for operating for driving the longitudinal cutting, the stepping motor 72 for driving longitudinal cutting in the widthwise direction of the sheet P, and the cutter motor 53 for driving lateral cutting operations.

Figure 12:
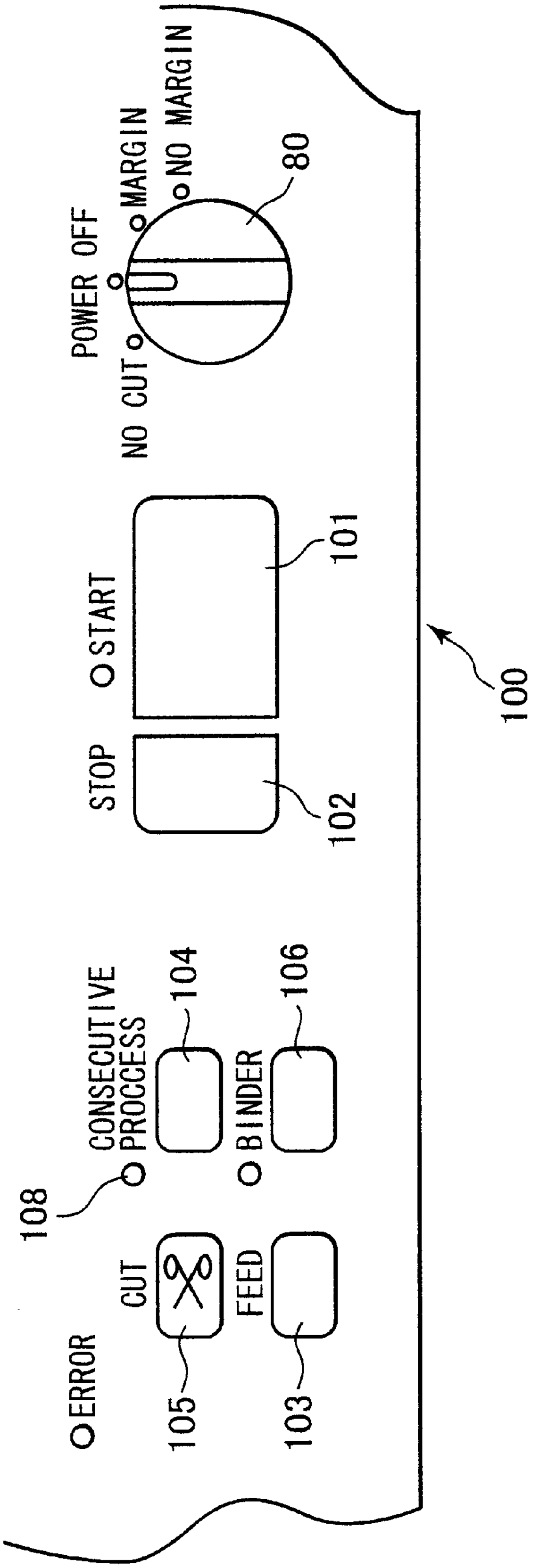
FIG. 12 is a plan view showing an operation panel of the laminating apparatus.
Figure 14A:
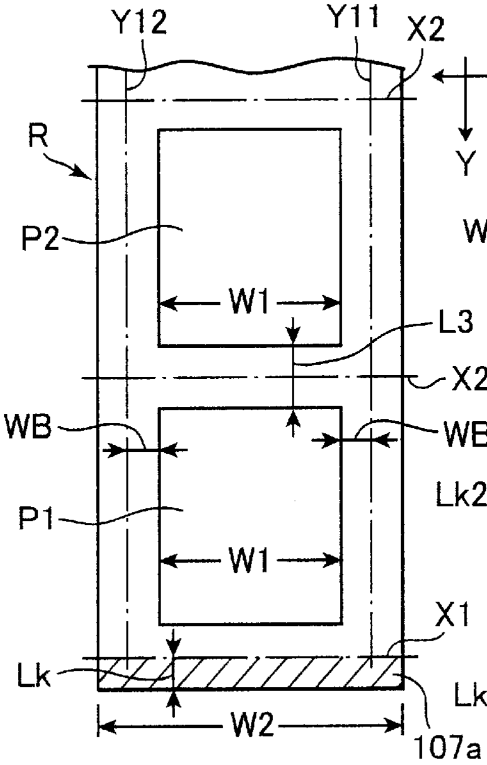
FIG. 14(*a*) is a schematic view showing cutting positions during a MARGIN mode when two consecutive sheets have the same width.
Figure 14B:
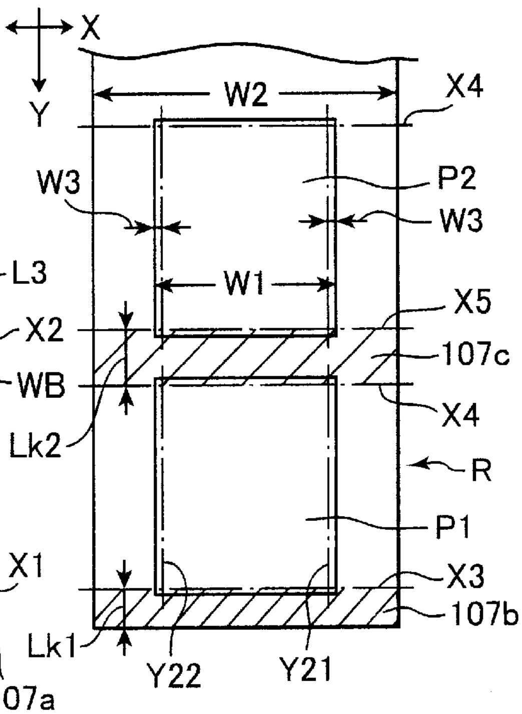
Figure 14C:
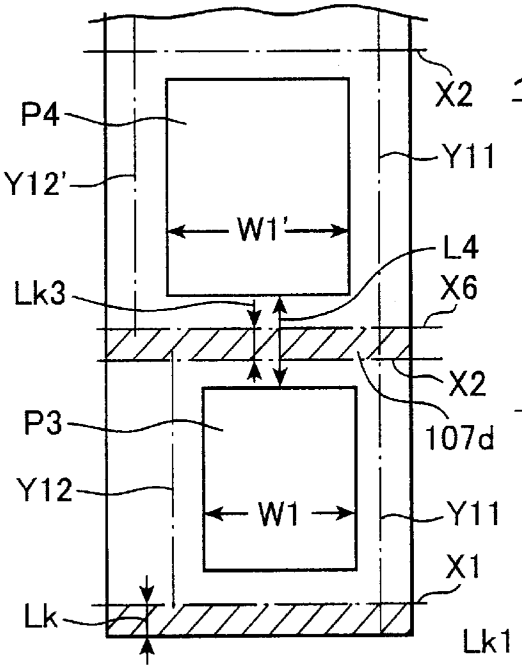
Figure 14D:
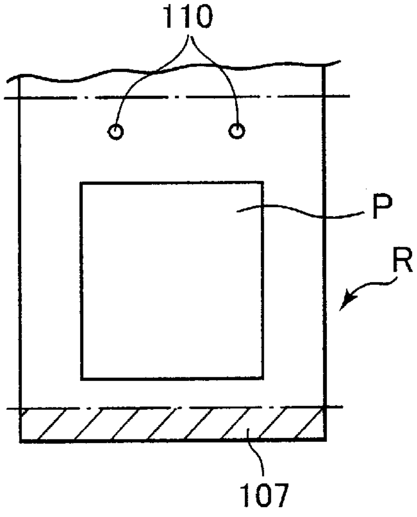

As shown in FIG. 12, an operation panel 100 is located on the upper surface, that is lid, of the case 1*a*. The operation panel 100 includes a start button 101, a stop button 102, a feed button 103. a consecutive process button 104, a cut button 105, and a binder button 106. When one of the buttons 101 to 106 is pressed and turned ON, the controller 92 generates a command that corresponds to the depressed button, so that predetermined corresponding operations are executed. For example, when the start button 101 is pressed down, lamination processes are started. When the stop button 102 is pressed down and turned ON, the laminating processes are temporarily stopped and the transport of the sheet P is stopped. When the start button 101 is again pressed down in this condition, transport and lamination of the sheet P restarts.

When the cut button 105 is pressed down and turned ON, the lateral cutting unit 41 operates to cut the laminate R at a desired position. When the feed button 103 is pressed down, the rollers 8*a*, 8*b* , 26, 27, 31 are driven to rotate so that the sheet P is transported, laminated, and the laminate R is discharged. When the feed button 103 is released, then the sheet transport and lamination processes are immediately stopped.

When the consecutive process button 104 is pressed down and turned ON, and sheets P on the sheet feed tray. are supplied one after the other separated by a fixed time. Then as shown in FIG. 14(*a*) adjacent laminates R, which correspond to adjacent sheets P, are laterally cut at position X2 so that no strip (107) is generated between the adjacent laminates R.

When the binder button 106 is pressed down, a rear margin portion formed at the rear edge of the laminate R, that is, behind the rear edge of the sheet P, is cut to a slightly larger length. In this case, as shown in FIG. 14(*d*), punch holes 110 can be punched into this rear margin portion so that the laminate R can be clipped into a binder. It should be noted that, although not shown in the drawings, when the consecutive process button 104 is turned OFF, then a single lamination routine is performed each time a single P is inserted in the lamination apparatus 1. In this case, a residual strip (107) will be generated at the front end of each laminate R.

Next, operations performed by the laminating apparatus 1 to prepare laminates R will be explained. First, when a single sheet P only is placed on the sheet feed tray 11, and the start button 102 is pressed down, the front edge of the sheet P is moved in between the sheet feed rollers 8*b*, 8*b*. Next, the transport drive motor 93 is rotated in the forward direction until the front edge of the transported sheet P is detected by the detection portion 74*a* of the arm 74, whereupon the electrical sensor 75 outputs a signal. The stepping motor 72 is driven to move the arm 65 in the rightward X direction. The detection lever 66*b* of the photo sensor 66 scans rightward until it abuts the left edge of the sheet P. In this way, the width of the sheet P is measured.

When the electrical sensor 75 output a signal indicating detection of the front edge of the sheet P. The number of drive pulses applied afterward to the transport drive motor 93 is counted to drive the transport motor 93 by a predetermined amount. If the transported sheet P is sufficiently long, then after the transport drive motor 93 is driven by this predetermined amount, the front edge of the sheet P will pass by the web cassette 20 and reach the nip between the pinch rollers 26, 27.

However, a potential problem arises if the sheet P is too short, and has a length Lx that is shorter than the length L0 of FIG. 13. If the transport drive motor 93 is driven by the predetermined amount when the sheet P is too short, then before the front edge of the short sheet P reaches the nip between the pinch rollers 26. 27, the end edge of the short sheet P will have already passed out from between the nip between the sheet feed rollers 8*a*, 8*b*. Therefore, the sheet transport can not be performed any further, so that the laminating processes cannot be performed.

To prevent this potential problem, the distance L1 from the photo sensor 66 to the detection portion 74*a* is set shorter than the distance L0 from the nip center between the sheet feed rollers 8*a*, 8*b* to the nip center between the pinch rollers 26, 27. Once the front edge of the sheet P is detected by the electrical sensor 75, then the transport drive motor 93 is driven while measuring the distance that the sheet P is transported. If the photo sensor 66 stops detecting the sheet P, that is, if the rear edge of the sheet P is detected to have passed by the detection position of the photo sensor 66, before the time the transport drive motor 93 transports the sheet P by a distance equivalent to (L0–L1), then it is determined that the sheet P is too short, so rotational direction of the sheet feed rollers 8*a*, 8*b* is reversed by reversing driving direction of the transport drive motor 93. With this configuration, before the rear edge of a short sheet P passes out through the nip portion between the sheet feed rollers 8*a*, 8*b*, the rotational direction of the sheet feed rollers 8*a*, 8*b* is reversed, so that the short sheet P is automatically return in the direction of the sheet feed tray 11.

The transport amount for the sheet P to enable executing detection of the width of the sheet P and existence of a sheet P using the photo sensor 66 is shorter than the distance equivalent to (L0–L1). Therefore, even if the side edge of the sheet P held between the sheet feed rollers 8*a*, 8*b* abuts against the detection lever 66*b* of the photo sensor 66, the orientation of the sheet P will not be changed.

While the rotary knob 80 is located at the POWER-OFF mode selection position, the cutter 62*a* of the reference-side longitudinal cutting unit 42*a* is located at the retracted position Y01 to the right of the edge of the laminate R as a result of mechanical linking relationship between the rotary knob 80 the operation shaft 85, and the link plate 86 described above. Also, because only the first detection switch 90 is in its ON condition, the cutter 62*b* of the other-side longitudinal cutting unit 42*b* will also be in Its retracted position Y02 to the left edge of the laminate R, and also the rotary power switch 82 will be in be turned OFF so that the power supply is stopped. It should be noted that when the rotary knob 80 is in any mode selection position other than the POWER-OFF mode selection position, the rotary power switch 82 will be turned ON so that power is supplied to the laminating apparatus 1 through the power circuit 83.

When the rotary knob 80 is in the NO-CUT mode selection position, the first and second selection switches 90, 91 will output OFF signals, which indicates that the laminate R should be discharged with the width same as the width of the supplied webs S1, S2. Therefore, the left and right longitudinal cutting units 42*a*, 42*b* are maintained in the same retracted positions as for the POWER-OFF mode selection position.

When the rotary knob 80 is rotated into the MARGIN mode selection position, the cutter 62*a* of the reference-side longitudinal cutting unit 42*a* is set in the position Y11 of FIG. 11. Also, both of the first and second selection switches 90, 91 output ON signals so that the stepping motor 72 is operated to move the arm 65 in one of the X directions until the photo sensor 66 detects the left edge of the introduced sheet P. Once the left edge is detected, the control program for providing margin controls to move the arm 65 in the direction for separating the arm 65 from the left edge of the sheet P. Movement of the arm 65 is stopped once the arm 65 has moved a duration of time required to separate the arm 65 from the left edge of the sheet P by the distance WB. At this time, the cutter 62*b* of the other-side longitudinal cutting unit 42*b*, which moves in the X directions in association with the arm 65, is set at the position Y12 of FIG. 11. Next, the sheet P is fed into the web cassette 20, and discharged a predetermined distance. Once the front edge of the laminate R is fed to pass-by both the cutting units 42*a*, 42*b*, the actuator 78 is operated so that the left and right cutters 62*a*, 62*b* are lowered down onto the laminate R so as to pierce through the laminate R. As a result, as the laminate R passes through the laminating apparatus 1, it is cut in the longitudinal direction to retain margins with a width WE at both left and right edges of the sheet P.

If the rotary knob 80 is rotated to the NO-MARGIN mode selection position, the cutter 62*a* of the reference-side longitudinal cutting unit 42*a* is set to the position Y21 shown in FIG. 11. Also, only the second selection switch 91 will output an ON signal. Therefore, the stepping motor 72 moves the arm 65 in one of the X directions until the photo sensor 66 detects the left edge of the sheet P. Then the control program for not providing any margin controls the stepping motor 72 to further move the arm 65 slightly to the right from the left edge of the sheet P, so that the cutter 62*b* of the other-side longitudinal cutting unit 42*b* is set at the position Y22 of FIG. 11, where the arm 65 is located slightly to the right of the left edge of the sheet P. Afterward, in the same manner as in the MARGIN mode, the left and right cutters 62*a*, 62*b* are driven to drop down and pierce the laminate R. As a result, the laminate R is cut longitudinally with no margin to the left and right sides of the sheet P.

Next, when the sheet feed rollers 88*a*, 88*b* and the pinch rollers 26, 27 are operated for a predetermined duration of time after the front edge of the introduced sheet P, which has a normal length, is detected, the rear edge of the sheet P will have passed by the location of the lateral cutting unit 41. Therefore, by operating the cutter motor after the sheet P has been transported slightly after passing the unit 41, the drive unit 48 moves reciprocally so as to cut the laminate R following the X directions while the side surface of the rotary knob 80 abuts against the fixed blade 45 to horizontally cut while maintaining a margin at the front and rear of the laminate R in the transport direction.

Next, an explanation will be provided for consecutive laminating processes while referring to the flowcharts in FIGS. 15 to 19. Consecutive laminating processes are performed when the consecutive process button 104 shown in FIG. 12 is pressed down. FIG. 14(*a*) shows the situation wherein sheets P1, P2 with the same width W1 are consecutively processed to prepare laminates R formed with a margin having a width WB to both left and right sides of the sheets P1, P2. In this case, the pointer of the rotary grip 80 is pre-set to the MARGIN mode selection position. Once the consecutive process button 104 is depressed, the display lamp 108, such as an LED, is continuously illuminated and the consecutive process mode is entered. First, the user places the first sheet P1 on the sheet feed tray 11, and presses the start button 101 down. As a result, the sheet feed rollers 8*a*, 8*b* are driven in S1 to rotate. The sheet P1 is picked up by the nip between the sheet feed rollers 8*a*, 8*b* and then transported until its front edge abuts against the detection portion 74*a*. As a result, the front edge of the sheet P1 is detected (S2:YES) and drive of the sheet feed rollers 8*a*, 8*b* is temporarily stopped in S3.

Next, in order to measure the width of the supply sheet P1 using the photo sensor 66, the arm 65 is moved in S4 in the rightward X direction into contact with the left edge of the sheet P1. The sheet feed rollers 8*a*, 8*b* are rotated in the forward direction in S5 until it is judged in S6 whether or not the sheet P1 is shorter than the predetermined length L0. During this time, the length of the sheet P1 is judged and the width of the sheet P1 is measured in S4. If the length of the sheet P1 were shorter than the predetermined length L0 (S6:NO), then the sheet feed rollers 8*a*, 8*b* would driven to rotate in the reverse direction in S7. However, in this example, the length of the sheet P1 is longer than the predetermined length L0 (S6:YES), so the sheet feed rollers 8*a*, 8*b* are further driven to rotate in the forward direction in S8 until it is judged in S9 that the front edge of the sheet P1 is transported to the position where the lamination processes start. Then in S10, the sheet P1 is subjected to the laminating processes by passing between the rotating pinch rollers 26, 26, until the front edge of the resultant laminate R is transported to near the longitudinal cutting unit 42.

In S11, the other side cutting unit 42*b* is transported according to the present mode. Because the lamination apparatus is in the MARGIN mode in the present example, the left side longitudinal cutting unit 42*b* is transported in the leftward X direction to position Y12 for producing a margin WB. In S12 the actuator (electromagnetic solenoid) 78 is driven so that the cutters 62*a*, 62*b* of the reference side longitudinal cutting unit 42*a* and the other side longitudinal cutting unit 42*b* lower into the sheet feed pathway.

Because the MARGIN mode is selected in this example (S13:NO), in S14 the pinch rollers 26, 27 and the sheet feed rollers 8*a*, 8*b* are further driven in the forward rotational direction until the front edge of the laminate R passes by the lateral cutting unit 41 by a distance Lk. As a result, the lateral cutting position X1, which is an imaginary line across the width of the laminate R, is positioned at the lateral cutting unit 41, so that a strip-shaped portion with only the webs S1, S2 adhered together, that is, with no portion of the sheet P1 interposed therebetween, extends beyond the lateral cutting unit 41 by a width Lk. In S15, transport of the laminate R is stopped and the fixed blade 45 and the rotational blade 50 of the lateral cutting unit 41 perform a lateral cut at the lateral cutting position X1. That is, the rotational blade 50 is driven to move reciprocally and cut the laminate R across its width, so that a strip 107*a* with a width Lk is cut off from the laminate R. As shown in FIG. 13, the lateral cutting unit 41 and the discharge rollers 31 are separated by a distance L2, that is, 18 cm in the present embodiment. The distance L2 is set shorter than the length Lk of the strip 107*a*. As a result, when performing a lateral cut, a front edge of the laminate R, that is, the front edge of the strip 107*a*, is held at a nip between the discharged rollers 31, so that the strip 107*a* can be discharged out of the laminating apparatus 1 from the discharge port 32 by driving the discharge rollers 31.

Next, in S16 lamination processes are restarted until a predetermined position beyond the end edge of the sheet P1 from when the detection portion 74*a* detects the rear edge of the transported sheet P1. That is, the pinch rollers 26, 27 and the discharge rollers 31 are driven to laminate the sheet P1 while the longitudinal cutting units 42*a*, 42*b* cut the laminate R along lines Y11, Y12 to retain a margin at widthwise edges of the laminate R.

Next, in S17 the cutter 62*a*, 62*b* of the longitudinal cutting units 42*a*, 42*b* are lifted up to a no-cut position. In S18, the other side longitudinal cutting unit 42*b* is moved to its home position to the left of the webs S1, S2, and stopped there. Next, in S19 both cutters 62*a*, 62*b* are lowered to prevent changing that margin setting. Then, in S20 drive of the sheet feed rollers 8*a*, 8*b*, the pinch rollers 26, 27, and the discharge rollers 31 is stopped to temporarily stop laminating processes.

Next, in S21 the user is urged to insert a subsequent sheet P2 while a predetermined time, that is, 7 seconds in the present embodiment, is awaited in S23. During the first half of this waiting time, the display lamp 108 is blinked ON and OFF for a constant interval. During the later half of the waiting time, the display lamp 108 is blinked ON and OFF at a shorter interval. This provides a user with a visual understanding of time passing until the sheet P2 is inserted in the laminating apparatus 1. If the user inserts a subsequent sheet P2 within the predetermined waiting time, and presses the start button 101 (S22:YES), then the laminating processes can be restarted and consecutively performed. Even if the start button 101 in not pressed, once the predetermined waiting time has elapsed (S23:YES), then after raising the cutters 62*a*, 62*b* in S24, forward rotation of the sheet feed rollers 8*a*, 8*b* will automatically start in S25.

If the user inserts the subsequent sheet P2 within the predetermined waiting time, and the user notices that the sheet P2 is tilted in the transport direction in the time between when the sheet feed rollers 8*a*, 8*b* begin rotating in the forward direction and when the front edge of the sheet P2 reaches the nip center between the pinch rollers 26, 27*a*, then the user can press the stop button 102 to have the sheet P returned to the sheet feed tray 11 and to return the laminating apparatus to the waiting condition of S23.

In this way, once the waiting time has elapsed (S23:YES), then in S24 the cutters 62*a* , 62*b* are raised up to release the margin setting change prevention condition. In S25 the sheet feed rollers 8*a*, 8*b* are then rotated in the forward direction until the detection portion 74*a* detects the front edge of the subsequent sheet P2 (S26:YES), whereupon the left edge of the sheet P is detected and the width of the sheet P is measured in S28. In S29 it is judged whether the subsequent sheet P2 has a different width than the preceding sheet P1. In S29, it is judged that the subsequent sheet P indeed has a different width than the preceding sheet P if the difference in their widths is a predetermined value, such as ±1 mm or greater. Processes performed when two sheets have different widths will be described later with reference to FIG. 14(*c*) and FIG. 19.

Because this example is for the MARGIN mode (S30:NO), in S31 the subsequent sheet P2 is transported until the distance between the front edge of the subsequent sheet P2 and the rear edge of the preceding sheet P1 is a predetermined distance L3. In this condition, in S32 both cutters 62*a*, 62*b* are lowered onto the end points of left and right longitudinal cuts previously cut in the preceding sheet P1, so that consecutive longitudinal cuts can be executed at the positions Y11, Y12.

Next, in S33 the rollers 8*a*, 8*b*, 26, 27, 31 are all driven together to perform lamination processes while transporting the sheets P1, P2 until a lateral cutting position X2 of the laminate R reaches the lateral cutting unit 41. As shown In FIG. 14(*a*), lateral cutting position X2 is positioned between the rear edge of the preceding sheet P1 and the front edge of the subsequent sheet P2. Then, in S34 the transport of the laminate R is stopped, and a lateral cut is performed.

As a result, a lateral cut is executed between the two successive sheets P1, P2 when performing consecutive laminating processes. A laminate R including the preceding sheet P1 is produced with a margin having a predetermined width around all the four edges of the preceding sheet P1. The laminate R with the preceding sheet P1 is discharged through the discharge port 31. Afterward, the processes described in S11 and on are repeated when a subsequent sheet P2 is inserted in the laminating apparatus 1 as in the present example, that is, that is, when consecutive laminating processes are performed. on the other hand, if after the waiting time is completed (S23:YES), the sheet feed rollers 8*a*, 8*b* are rotated for a predetermined duration of time without detecting the front edge of a subsequent sheet P2 (S27:YES), then it is assumed that no subsequent sheet P2 was inserted into the laminating apparatus. In this case, in S35 the sheet P1 is transported to perform laminating processes and left and right longitudinal cuts. In S36 the laminate R is stopped so that a predetermined margin section from the rear edge of the sheet P is located at the lateral cutting position X3, and a lateral cut is executed. Afterward, in S37 the discharge rollers 31 alone are driven to rotate so that the laminate R is discharged from the laminating apparatus 1.

Figure 15:
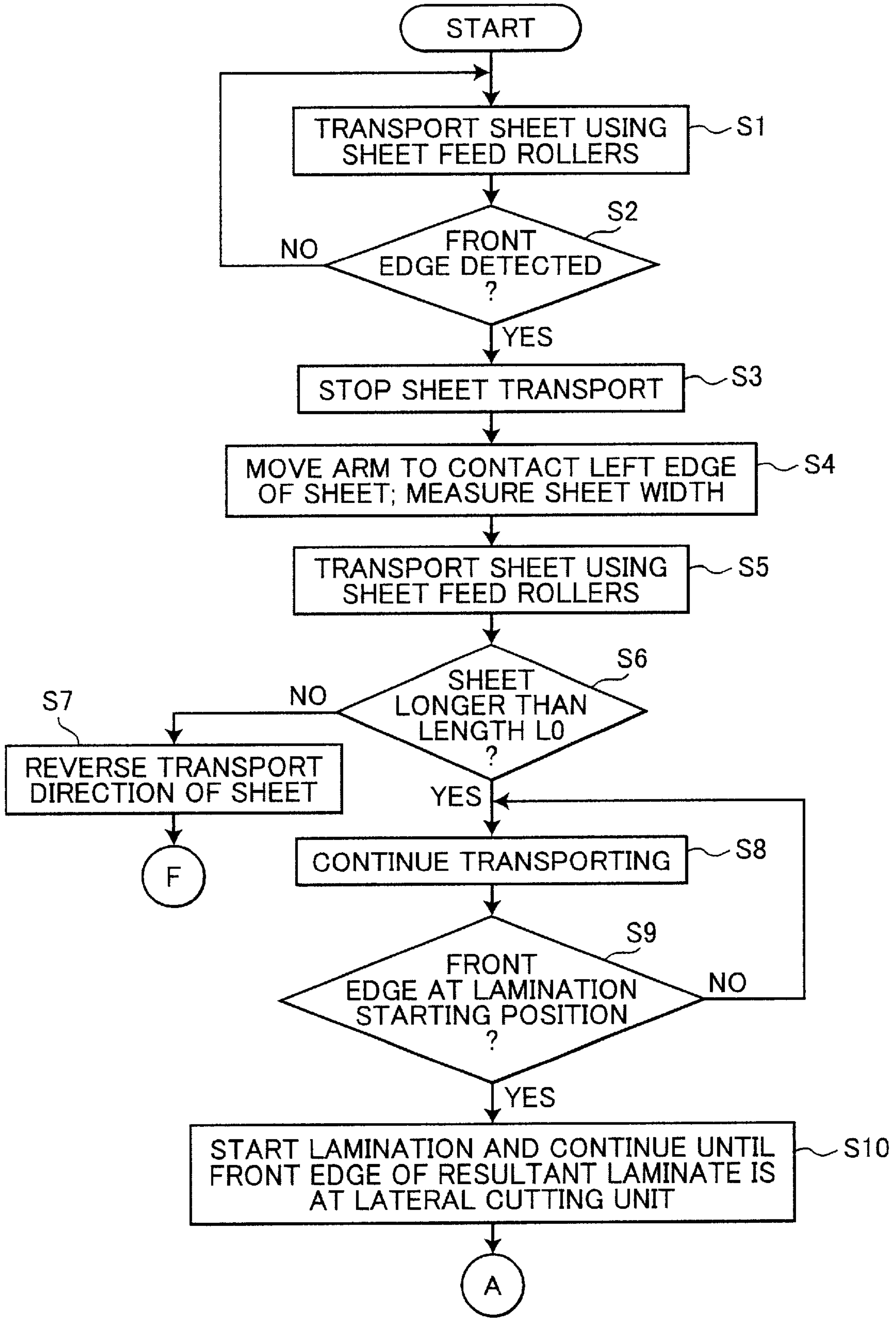
FIGS. 15 to 19 are flowcharts representing lamination operations performed by the laminating apparatus.
Figure 16:
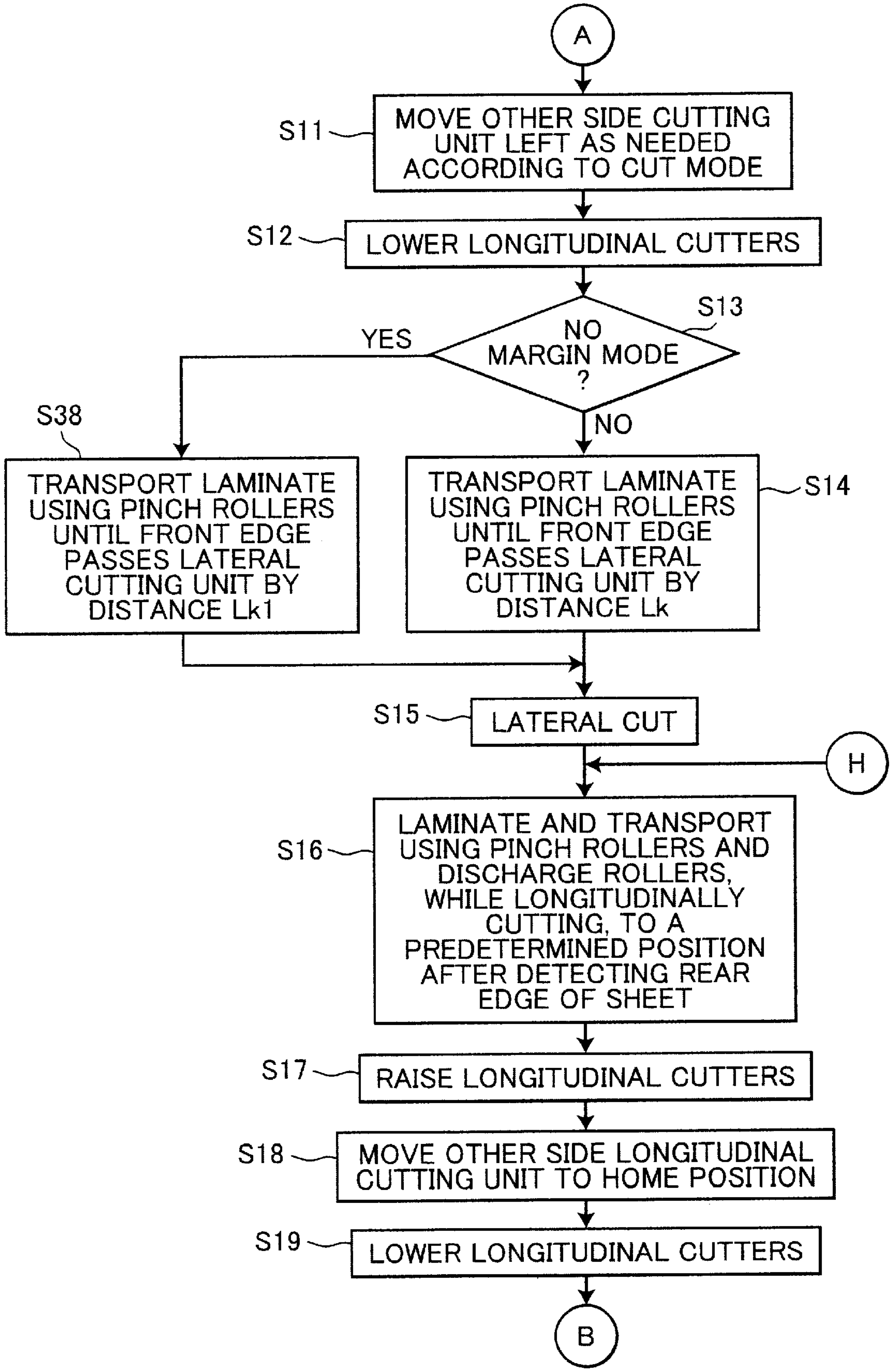
Figure 17:
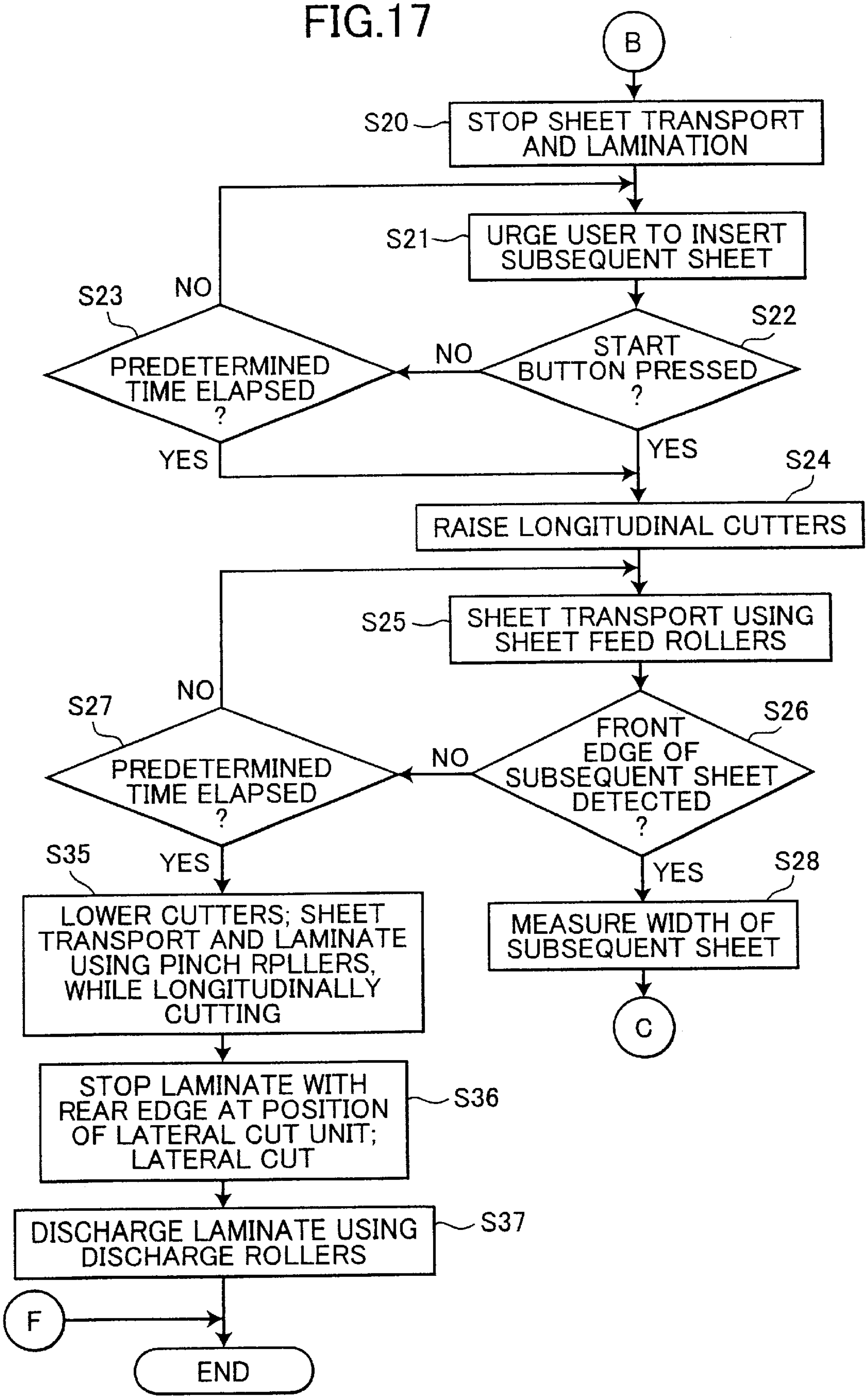
Figure 18:
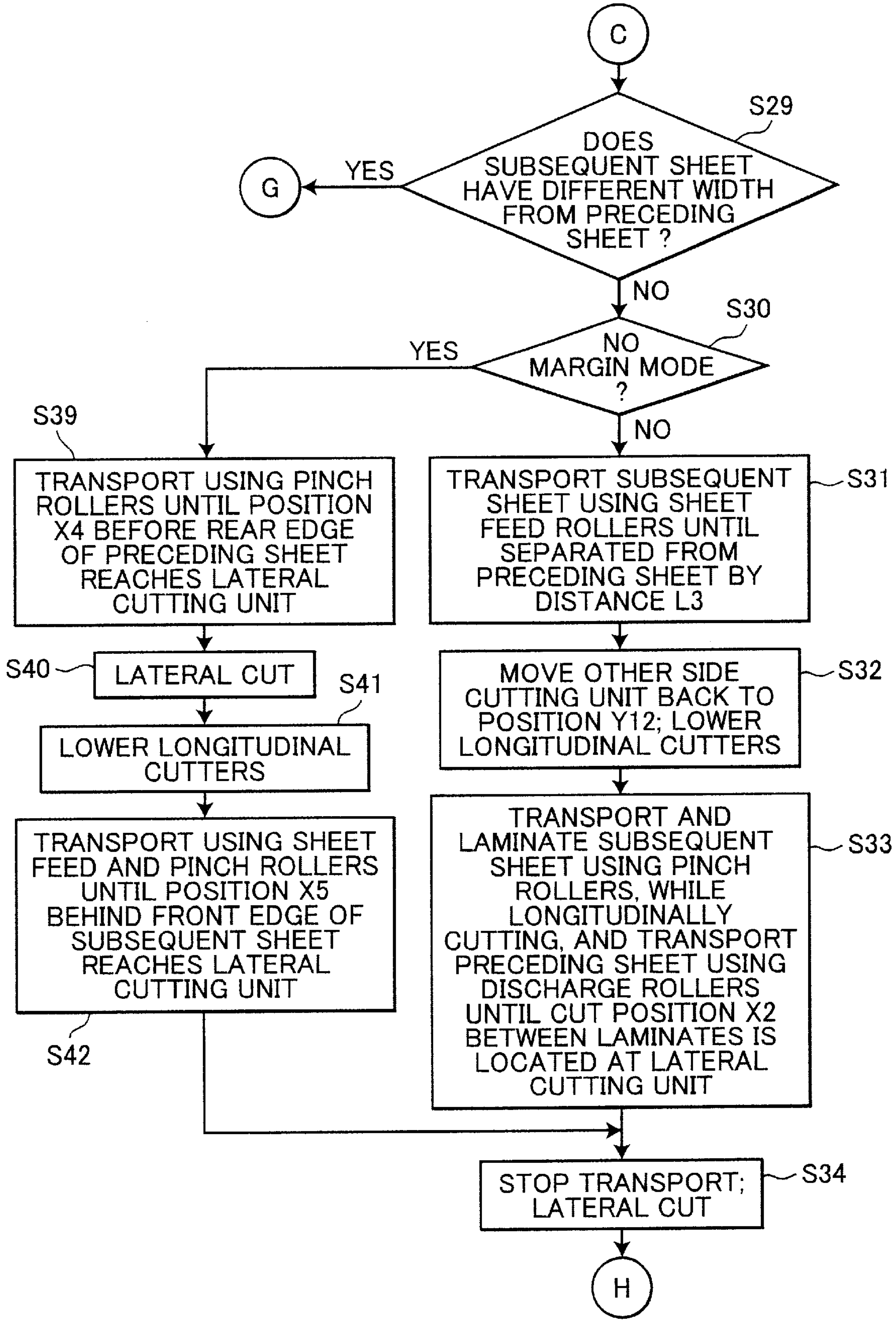
Figure 19:
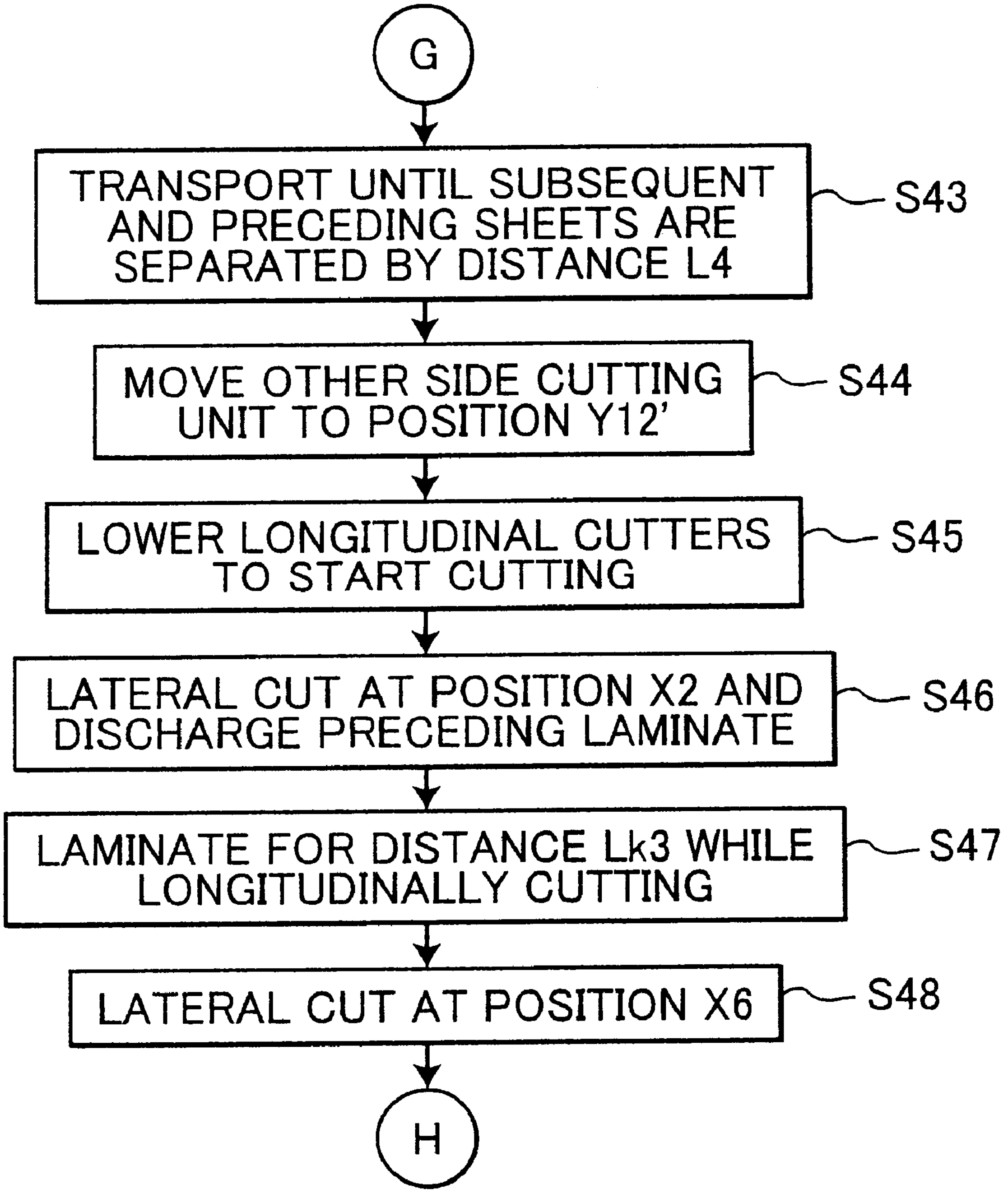

Next, an example will be provided for consecutive laminating processes performed in the NO MARGIN mode while referring to FIG. 14(*b*). To set the MARGIN mode, the rotary grip 80 is rotated to point at the NO MARGIN position. As a result, after S1 to S10 of FIG. 15 are executed as described above, in S11 the other side longitudinal cutting unit 42*b* is moved leftward and stopped at a predetermined position with its left side is slightly to the right from the left edge of the sheet P. Then in S12 the actuator 78 is driven to lower the cutters 62*a*, 62*b* of the cutting units 42*a*, 42*b* into the sheet transport pathway. As shown in FIG. 14(*b*), in S12 the left and right cutters 62*a*, 62*b* are lowered within a strip 107*b* and at points on lines Y21, Y22, respectively.

Because this example is for the NO MARGIN mode (S13:YES), in S38 the laminate is transported until its front edge passes the lateral cutting unit 41 by a distance equivalent to the width Lk1 of the strip 107*b*. While transported, the laminate R is cut on its left and right sides to an extent to also slightly cut the sheet P1 by a width W3. Transport is stopped when the front edge of the laminate R passes by the lateral cutting unit 41 by the distance Lk1, so that a position X3 of the laminate R is aligned with the lateral cutting unit 41. When the lateral cutting unit 41 is driven in S15, the lateral cutting unit 41 will cut the laminate R along line XS so that a strip 107*b* with a width Lk1 is generated.

After the end edge of the preceding sheet P1 is detected in S16, then S17 to S22 are performed as described above. After the predetermined waiting time for inserting a subsequent sheet P has elapsed (S23:YES), then S24 to S28 are performed as described above. After it is determined that the subsequent sheet P2 has the same width as the preceding sheet P1 (S29:NO), then in S30 it is determined that the laminating apparatus 1 is in the NO MARGIN mode (S30:YES), whereupon in S39 transport is performed until just before the rear edge of the preceding sheet P1 reaches the lateral cutting unit 41. Then in S40 a lateral out is performed along line X4 of the preceding laminate R to leave no web margin at the rear edge of the preceding sheet P1. Next, the longitudinal cutters 62*a*, 62*b* are lowered in S41. In S42 transport is performed until the front edge of the subsequent sheet P2 is located slightly beyond the lateral cutting unit 41. Then, in S34 a lateral cut is performed along the lateral out line X5 to leave no web margin beyond the front edge of the subsequent sheet P2. With these operations, a strip 107*c* with length Lk2 is cut off from between the laminates, and the preceding laminate R ejected from the discharge port 32 of the laminating apparatus 1 has all four sides with no laminated portion formed from the webs S1, S2. Said differently, a laminate R with no margin can be formed. Afterward, the above-described operations can be repeatedly executed as needed.

Next, consecutive lamination processes performed when preceding and subsequent sheets P3, P4 have different width dimensions will be described while referring to FIG. 14(*c*). In this example, the first sheet P3 has a width W1 and the second sheet P4 has a different width W1'. Laminating processes are performed on the first sheet P3 in S1 to S28 in the same manner as described above. After the width W1' of the subsequent sheet P4 is measured, and determined to be different from that of the preceding sheet P2 (S29:YES), then in S43 the subsequent sheet P4 is transported until the front edge of the subsequent sheet P4 and the rear edge of the preceding sheet P3 are separated by a distance L4. In S44 the other side cutting unit 42*b* is moved from the position Y12 to a position Y12' because the left edge of the subsequent sheet P4 Is positioned differently from the left edge of the preceding sheet P3. Then, in S45 the longitudinal cutters 62*a*, 62*b* are lowered and a longitudinal cut is started. At this time, the left cutter 62*b* is lowered at the position Y12' where a margin with a predetermined dimension will be formed from the left edge. Next, in S46 the lateral cutting unit 41 is driven at the position X2 for. performing a lateral cut to retain a predetermined margin to the rear edge of the preceding sheet P1. Then, in S47 the laminate including the preceding sheet P1 is separated from the laminate including the subsequent sheet P2 and discharged from the laminating apparatus 1 by the discharge rollers 31.

Next, in S47 the laminating processes are executed for the distance Lk3. In S48 the lateral cutting unit 41 is driven at position X6 to make a lateral cut for removing a strip 107*d* with a length Lk3. Then the routine returns to S16, whereupon the cutting units 42*a*, 42*b* are driven to cut following longitudinal lines Y11, Y12' as shown in FIG. 14(*c*) in order to form predetermined margins to two left and right sides of the laminated subsequent sheet P.

During the different lamination processes described above, when only the sheet feed rollers 8*a*, 8*b* are to be driven by drive force transmitted from the transport drive motor 93, the clutch mechanism 109 is switched so that drive force from the motor 93 is cut off for the pinch rollers 26, 27 and the discharge rollers 31. The clutch mechanism 109 is further switched to drive rotation of all of the rollers 8*a*, 8*b*, 26, 27, and 31 at the same time, and to drive rotation of only the rollers 8*a*, 8*b*, 31.

Also, the size relationship between the rollers 31, 26, 28, 8*a*, 8*b* is set so that the peripheral speed of the discharge rollers 31 is greater than that of the pinch rollers 26, 27, and the peripheral speed of the pinch rollers 26, 27 is greater than that the sheet feed rollers 8*a*, 8*b*. Furthermore, the size relationship of the rollers is set so that the pressing force at the nip between the discharge rollers 31 is greater than that at the nip between the pinch rollers 26, 27, and that the pressing force at the nip between the pinch rollers 26, 27 is greater than that at the nip between the sheet feed rollers 8*a*, 8*b*. With this configuration, the sheet P will not bend from when it is supplied from the sheet supply portion until lamination processes are finished. Also, the lamination sheet will not tilt its orientation during lamination. Also, the sheet will not wrinkle. Also, cutting mistakes generated by the laminate bending during lateral or longitudinal cutting operations, after lamination is completed, can be reliably prevented.

The present invention can be applied to a configuration wherein the sheet to be laminated with the laminating webs is inserted directly into the laminating apparatus without use of a web cassette.

What is claimed is:

1. A laminating apparatus comprising:

an introduction-side transport unit that transports objects to be laminated in a transport direction;

a web supply unit that supplies a pair of webs;

a laminate processing unit that adheringly laminates the pair of webs onto upper and lower surfaces of the objects;

a detector disposed between the introduction-side transport unit and the web supply unit, and that detects a front edge of objects transported by the introduction-side transport unit; and a consecutive lamination control unit that, when the detector detects a front edge of the prior object transported by the introduction-side transport unit, controls the introduction-side transport unit and the laminate processing unit to;

transport and laminate the prior object until a rear edge of the prior object is positioned in the vicinity of the web supply unit;

stop transport and lamination of the prior object for a predetermined duration of time after the rear edge of the prior object is positioned in the vicinity of the web supply unit; and transport a subsequent object to the laminate processing unit once the detector detects a front edge of the subsequent object after the predetermined duration of time elapses from stopping transport of the prior object.

2. A laminating apparatus as claimed in claim 1, further comprising a lateral cutting unit that cuts in a lateral direction that is perpendicular to the transport direction, the lateral cutting unit being positioned downstream from the laminate processing unit, the consecutive lamination control unit controlling the lateral cutting unit to cut the webs along an imaginary line between the rear edge of the preceding object and the front edge of the subsequent object.

3. A laminating apparatus as claims in claim 2, wherein the consecutive lamination control unit controlling the lateral cutting unit to cut the webs at the position when consecutively executing laminating processes during a margin mode.

4. A laminating apparatus as claimed in claim 2, further comprising a pair of discharge rollers provided downstream from the lateral cutting unit in the transport direction, the distance between the discharge rollers and the lateral cutting unit being set shorter than a length of margin residues strips out from laminates by the lateral cutting unit.

5. A laminating apparatus as claimed in claim 1, further comprising an Indication unit that visually indicates elapse of time by dividing the predetermined duration of time into substantial front and rear halves when the consecutive lamination control unit controls to perform consecutive lamination.

6. A laminating apparatus as claimed in claim 1, further comprising an operation panel including a mode setting switch for selectively setting;

a single item process mode for laminating single sheets at a time;

a consecutive laminate process routine; and a binder mode for forming laminates with a large-width margin portion downstream with respect to the transport direction.

7. A laminating apparatus comprising:

introduction-side transport rollers that transport objects to be laminated in a transport direction;

a web supply unit that supplies a pair of webs;

a laminate processing unit that adheringly laminates the pair of webs onto upper and lower surfaces of the objects;

a detector disposed between the introduction-side transport rollers and the web supply unit, and that detects a front edge of objects transported by the introduction-side transport rollers; and a consecutive lamination control unit that, when the detector detects a front edge of the prior object transported by the introduction-side transport rollers, controls:

the introduction-side transport rollers and the laminate processing unit to transport and laminate the prior object until a rear edge of the prior object is positioned in the vicinity of the web supply unit;

the introduction-side transport rollers and the laminate processing unit to stop transport and lamination of the prior object for a predetermined duration of time after the rear edge of the prior object is positioned in the vicinity of the web supply unit; and the introduction-side transport rollers to transport a subsequent object to the laminate processing unit once the detector detects a front edge of the subsequent object after the predetermined duration of time elapses from stopping transport of the prior object.

* * * * *